United States Patent
Narushima et al.

(10) Patent No.: US 7,787,215 B2
(45) Date of Patent: Aug. 31, 2010

(54) THIN FILM MAGNETIC HEAD IN WHICH THERMAL PROTRUSION IS SUPPRESSED AND METHOD OF FORMING THE SAME

(75) Inventors: Shin Narushima, Tokyo (JP); Naoto Matono, Nagano (JP); Takamitsu Sakamoto, Tokyo (JP); Noriaki Kasahara, Tokyo (JP); Koichi Otani, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 764 days.

(21) Appl. No.: 11/730,153

(22) Filed: Mar. 29, 2007

(65) Prior Publication Data

US 2008/0253032 A1 Oct. 16, 2008

(51) Int. Cl.
*G11B 5/147* (2006.01)
(52) U.S. Cl. .............. 360/125.26; 360/125.32
(58) Field of Classification Search ................ 360/125.02–125.32
See application file for complete search history.

(56) References Cited

U.S. PATENT DOCUMENTS

| 6,950,280 B2 * | 9/2005 | Rea et al. ............... 360/125.31 |
| 6,989,963 B2 * | 1/2006 | Kautzky et al. ........ 360/125.32 |

FOREIGN PATENT DOCUMENTS

| JP | A 5-182133 | 7/1993 |
| JP | A 6-168418 | 6/1994 |
| JP | A 2003-248907 | 9/2003 |

* cited by examiner

*Primary Examiner*—A. J. Heinz
(74) *Attorney, Agent, or Firm*—Oliff & Berridge, PLC

(57) ABSTRACT

A thin film magnetic head is provided, in which thermal protrusion can be suppressed. The thin film magnetic head includes a main magnetic pole layer which conducts a magnetic flux into the recording medium so that the recording medium is magnetized in a direction perpendicular to a surface of the recording medium, a first return yoke layer provided in a trailing side of the main magnetic pole layer, and has a recess in a top surface, a second return yoke layer provided so as to fill at least the recess of the first return yoke layer, and a thermal expansion suppression layer provided in a trailing side of the second return yoke layer. Thus, since the thermal expansion suppression layer can be provided on a surface having no recess, a possibility of a crack in the thermal expansion suppression layer can be eliminated.

17 Claims, 16 Drawing Sheets

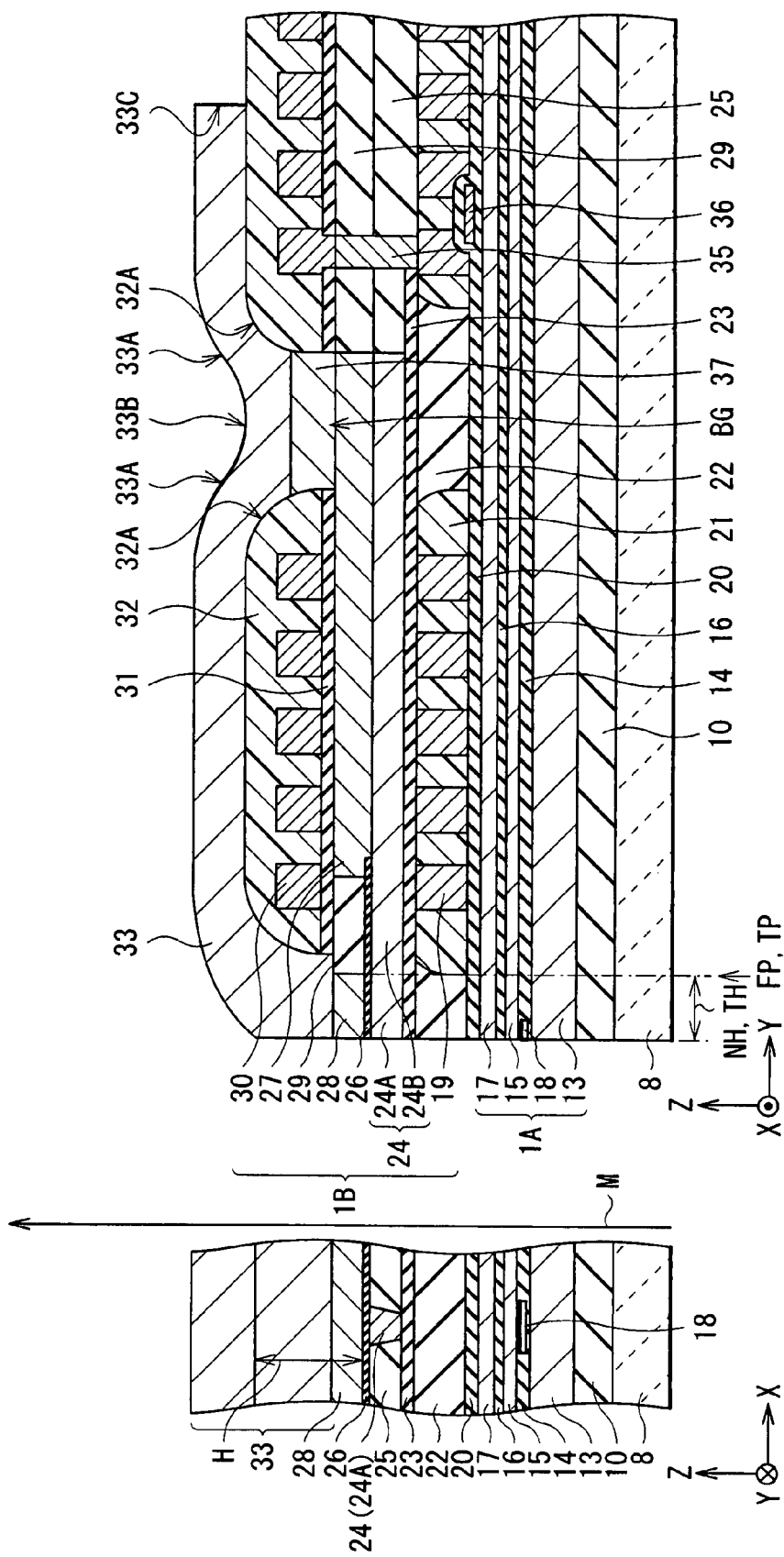

THIN FILM MAGNETIC HEAD IN WHICH THERMAL PROTRUSION IS SUPPRESSED AND METHOD OF FORMING THE SAME

BACKGROUND OF THE INVENTION

1. Field of the Invention

The present invention relates to a thin film magnetic head mounted with a magnetic transducer element and a method of forming the same, and a head gimbal assembly mounted with the thin film magnetic head, head arm assembly, and magnetic disk device.

2. Related Art

A magnetic disk device has been used for write and read of magnetic information (hereinafter, simply mentioned as information). For example, the magnetic disk device includes a magnetic disk for storing information, and a thin film magnetic head for writing information into the magnetic disk and reading information written in the magnetic disk. The magnetic disk is supported by a spindle of a spindle motor fixed to a housing, and rotated with the spindle as a center. On the other hand, the thin film magnetic head is formed on one side face of a magnetic head slider provided on one end of a suspension, and includes a magnetic write element having an air bearing surface (ABS; Air Bearing Surface) facing a magnetic disk, and a magnetic read element. In particular, an MR element exhibiting a magnetoresistive (MR) effect is typically used for the magnetic read element. The other end of the suspension is attached to a tip of an arm rotatably supported by a fixed shaft protrusively provided on the inside of the housing.

In recent years, increase in write density (increase in capacity) of the magnetic disk is advanced, and decrease in write track width is advanced along with this. When the write track width is decreased in this way, size of a thin film magnetic head is also reduced. Therefore, the magnetic write element is reduced in signal writing ability into the magnetic disk, and intensity of a signal magnetic field from the magnetic disk is also reduced. To compensate such function reduction, for example, a further strong write magnetic field needs to be generated, or magnetic spacing needs to be decreased (ABS of the thin film magnetic head is made close to a surface of the magnetic disk).

Thus, for example, it is considered that a larger write current is flown during information writing operation in order to generate a strong write magnetic field. However, when a large current is flown, the thin film magnetic head itself is heated, which may follow expansion of the magnetic head to the magnetic disk, so-called thermal protrusion. When thermal protrusion occurs in this way, a magnetic write device possibly becomes insufficient in reliability as the device.

Many techniques for suppressing thermal protrusion have been reported. For example, Japanese Utility Model Patent Publication No. 2-101308, Japanese Unexamined Patent Publication No. 2004-22003, Japanese Unexamined Patent Publication No. 2004-362660, and Japanese Unexamined Patent Publication No. 2003-91802 disclose suppression of thermal protrusion by providing a radiation layer including metal on a magnetic layer to improve heat radiation (first measure). Moreover, for example, U.S. Pat. No. 6,989,963 discloses suppression of thermal protrusion by providing a radiation layer including a material having a large heat conductivity in a manner of covering a thin film coil for generating a magnetic flux, so that heat radiation is improved (second measure). Moreover, for example, "On the Thermal Behavior of Giant Magnetoresistance Heads" B. K. Gupta, Kenneth Young, Samerra K. Chilamakuri, Aric K. Menon, pp. 380-387, vol. 123, APRIL 2001 discloses suppression of thermal protrusion by providing a thermal expansion suppression layer including a material, which has a small thermal expansion coefficient and a large heat conductivity, directly on the magnetic layer, so that heat radiation is improved, and displacement of the magnetic layer or the like to the magnetic disk is suppressed (third measure). Moreover, for example, Japanese Unexamined Patent Publication No. 2005-285236 discloses suppression of thermal protrusion by providing a thermal expansion suppression layer as the above on a magnetic layer via a protective layer including alumina, so that the magnetic layer or the like is prevented from being displaced to the magnetic disk (fourth measure).

SUMMARY OF THE INVENTION

However, in the first measure, since metal having a large thermal expansion coefficient is used for the radiation layer, thermal protrusion may occur under the influence of surrounding temperature environment. In the second measure, since the radiation layer is provided in the periphery of the thin film coil for generating a magnetic flux, the radiation layer is restricted in volume, consequently it is considered that effects of improving heat radiation and suppressing thermal protrusion are not so large. In addition, the radiation layer is not easily provided in the periphery of the thin film coil, leading to restriction in process.

On the other hand, in the third measure, since the thermal expansion suppression layer is provided, there is substantially no possibility of thermal protrusion under the influence of surrounding temperature environment. Moreover, since the thermal expansion suppression layer is directly provided on the magnetic layer, so that it has good heat radiation, it is considered that there is substantially no possibility that thermal protrusion significantly occurs by heating of the thin film coil. However, the third measure is not preferable since various difficulties may occur as described below.

FIG. 18 shows part of a sectional configuration of a write head portion of a thin film magnetic head 400. The thin film magnetic head 400 has a thin film coil 401 for generating a magnetic flux for write, write shield layer 402, and thermal expansion suppression layer 403. Here, the thin film coil 401 has a spiral structure wound with a back gap 404 as a center. The thin film coil 401 is provided on an insulating layer 405, and buried in an insulating layer 406 provided on the insulating layer 405. The insulating layer 406 has a rounded, steep slope 407 in a portion near an edge. The write shield layer 402 is provided over a surface including the insulating layer 406 and the back gap 404. In the write shield layer 402, a recess having a steep slope is formed in a portion corresponding to a portion directly above the back gap 404. The thermal expansion suppression layer 403 is provided on a surface of the write shield layer 402 including the recess, and has a recess 408 correspondingly to the recess of the write shield layer 402. The recess 408 has a steep slope 409 as the slope 407 near the back gap 404.

When the thermal expansion suppression layer 403 is formed in the thin film magnetic head 400 having such a configuration, typically, a low thermal expansion material is deposited on the whole surface using a sputtering method or the like, then a mask layer (not shown) is formed, the mask layer having an opening corresponding to a portion to be intentionally removed, and then a pattern of the mask layer is transferred to the deposited, low thermal expansion material using a dry etching process such as RIE (Reactive Ion Etching). Then, the mask layer is removed. However, when the recess 408 having the steep slope 409 is small, the mask layer cannot be sometimes removed and remained in the recess 408. In this case, the remained mask layer possibly reduces reliability of the thin film magnetic head 400.

When the thermal expansion suppression layer 403 is formed similarly in the recess of the write shield layer 402, a crack is sometimes generated in a step portion formed by a bottom and a slope of the recess. When a crack is generated in the thermal expansion suppression layer 403, behavior of the thermal expansion suppression layer 403 to heat is changed, consequently thermal protrusion may occur depending on shape or size of the crack.

In that respect, in the fourth measure, since the protective layer including alumina is formed thick on the magnetic layer, and a top of the protective film is planarized, and then the thermal expansion suppression layer is provided on the planarized top, there is no possibility of a remained mask layer or a crack when the thermal expansion suppression layer is formed using a dry etching process. However, when the protective layer including alumina is formed thick between the magnetic layer and the thermal expansion suppression layer in this way, heat conductivity from the magnetic layer to the thermal expansion suppression layer may be deteriorated, resulting in reduction in heat radiation. As a result, heat may be stored in the inside, leading to thermal protrusion.

In this way, in the related art, there has been a difficulty that thermal protrusion is not easily suppressed.

In view of foregoing, it is desirable to provide a thin film magnetic head in which thermal protrusion can be suppressed, and a method of forming the same, and a head gimbal assembly, head arm assembly, and magnetic disk device.

A thin film magnetic head of an embodiment of the invention includes a main magnetic pole layer, first return yoke layer, second return yoke layer, and thermal expansion suppression layer. Here, the main magnetic pole layer extends in a direction crossing an air bearing surface facing a recording medium, and conducts a magnetic flux into the recording medium so that the recording medium is magnetized in a direction perpendicular to a surface of the recording medium. The first return yoke layer is provided on a trailing side of the main magnetic pole layer, a face on a trailing side of the first return yoke layer having a recess. The second return yoke layer is provided so as to fill at least the recess of the first return yoke layer. The thermal expansion suppression layer is provided on a trailing side of the second return yoke layer.

A head gimbal assembly of an embodiment of the invention includes a magnetic head slider having the thin film magnetic head on one side face, and a suspension attached with the magnetic head slider at one end thereof. A head arm assembly of an embodiment of the invention includes the head gimbal assembly, and an arm supporting the other end of the suspension. Furthermore, a magnetic disk device of an embodiment of the invention includes a magnetic recording medium, and the head arm assembly.

A method of forming the thin film magnetic head of an embodiment of the invention includes the following three steps (A) to (C):

(A) a step of forming the main magnetic pole layer so as to extend in a direction crossing the air bearing surface facing the recording medium, and conduct a magnetic flux into the recording medium so that the recording medium is magnetized in a direction perpendicular to a surface of the recording medium, then forming the first return yoke layer having the recess on the trailing side of the main magnetic pole layer, (B) a step of forming the second return yoke layer so as to fill at least the recess of the first return yoke layer with a magnetic material, and (C) a step of forming the thermal expansion suppression layer on the trailing side of the second return yoke layer.

In the thin film magnetic head and the method of forming the same, and the head gimbal assembly, head arm assembly, and magnetic disk device of an embodiment of the invention, the two return yoke layers (first return yoke layer and second return yoke layer) are formed on the trailing side of the main magnetic pole layer, and the recess formed in the first return yoke layer is filled by the second return yoke layer. Thus, since the thermal expansion suppression layer can be provided on a surface having no recess, for example, a possibility of a crack in the thermal expansion suppression layer can be eliminated. Moreover, since there is no possibility that a mask layer used in forming the thermal expansion suppression layer is remained in an area where the mask layer is normally to be removed, there is also no possibility of unnecessary remainder of the thermal expansion suppression layer, or an unpredictable residue of the mask layer. Thus, when a protective film is formed on the thermal expansion suppression layer, possibility of a crack can be eliminated in a portion where the protective film is formed on the unnecessary remainder of the thermal expansion suppression layer or the residue of the mask layer. As a result, reduction in reliability caused by a crack, or variation in thermal protrusion for each element due to the crack can be suppressed.

Here, when the second return yoke layer has a flat top surface above at least the recess of the first return yoke layer, difficulties as above hardly occur. Therefore, thermal protrusion can be effectively suppressed while keeping reliability.

When the second return yoke layer extends backward from a position retracted from the air bearing surface beyond a position where the recess is formed, only the first return yoke layer is exposed on the air bearing surface in the return yoke layers provided on the trailing side of the main magnetic pole layer. Thus, even if a step of planarizing a top of the second return yoke layer is conducted, there is no possibility of variation due to planarization in area exposed on the air bearing surface of the return yoke layer being provided on the trailing side of the main magnetic pole layer. Therefore, thermal protrusion can be suppressed while a write characteristic of the thin film magnetic head is kept constant.

When a front edge of the thermal expansion suppression layer is located on the second return yoke layer, the thermal expansion suppression layer is not influenced by a step caused by an edge of the first return yoke layer. Therefore, difficulties as above due to the edge of the first return yoke layer do not occur. Thus, thermal protrusion can be suppressed.

When an insulating layer is located between a front edge of the second return yoke layer and the air bearing surface, a front edge of the thermal expansion suppression layer can be located on the insulating layer without being influenced by the step caused by the edge of the first return yoke layer. Thus, since the thermal expansion suppression layer can be made close to the side of the air bearing surface, thermal protrusion can be suppressed.

When the second return yoke layer is contacted to the first return yoke layer, and the thermal expansion suppression layer is contacted to at least the second return yoke layer, heat generated within the thin film magnetic head is transferred to the thermal expansion suppression layer via the first return yoke layer and the second return yoke layer, and radiated to the outside and the like from the thermal expansion suppression layer. Thus, since heat is hardly stored within the thin film magnetic head, thermal protrusion due to heat generated within the thin film magnetic head can be suppressed. In this case, it may be said that the thermal expansion suppression layer is electrically connected to the first return yoke layer and the second return yoke layer. At that time, when at least one of the first return yoke layer and the second return yoke layer is shunted, the thermal expansion suppression layer is not charged. Therefore, there is no possibility of reduction in reliability due to electrostatic charge.

When a heating element is provided in a position retracted from the air bearing surface, the heating element is heated, thereby the main magnetic pole layer and the like can be actively displaced to a recording medium side. At that time, since the return yoke layers and the like directly below the thermal expansion suppression layer are restricted in displacement to the recording medium side by the thermal expansion suppression layer, only a portion to be desirably displaced (the main magnetic pole layer and the like) can be selectively displaced to the recording medium side. Thus, since magnetic spacing can be controlled, the amount of displacement to the recording medium side of the main magnetic pole layer and the like is appropriately adjusted using the heating element, thereby magnetic spacing can be stabilized.

Other objects, features, and advantages of an embodiment of the invention are clarified in the following description as needed.

BRIEF DESCRIPTION OF THE DRAWINGS

FIGS. 17a to 17b is a sectional configuration views for explaining a step subsequent to a step of FIG. 16.

DETAILED DESCRIPTION OF THE PREFERRED EMBODIMENTS

Hereinafter, a preferred embodiment of the invention will be described in detail with reference to drawings.

Configurations of a thin film magnetic head 1 of an embodiment of the invention, a head gimbal assembly 2 mounted with the thin film magnetic head 1, head arm assembly 300, and magnetic disk device are described hereinafter with reference to FIGS. 1 to 18.

Figure 1:
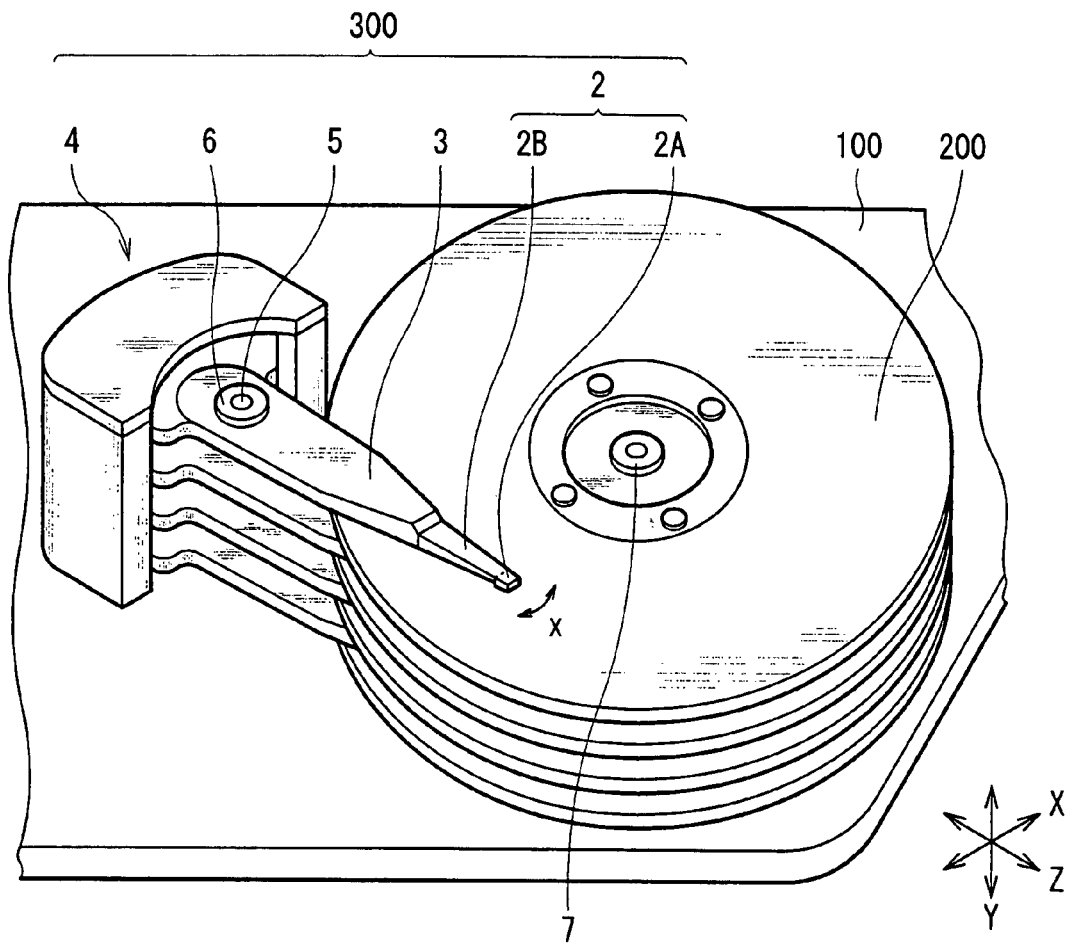
FIG. 1 is a perspective view showing an internal configuration of a magnetic disk device according to an embodiment of the invention.

FIG. 1 is a perspective view showing an example of an internal configuration of the magnetic disk device according to the embodiment. For example, as shown in FIG. 1, the magnetic disk device has one or several (four in FIG. 1) magnetic recording medium 200 (for example, hard disk) capable of writing information, and a head arm assembly (HAA) 300 for writing information into the magnetic recording medium 200, and reading the information.

The HAA 300 has, for example, a head gimbal assembly (HGA) 2, an arm 3, and a drive section 4. The HGA 2 has a magnetic head slider (hereinafter, simply called "slider") 2A provided correspondingly to write surfaces (surface and back) of the magnetic recording medium 200, and a suspension 2B attached to one end of the slider 2A. The arm 3 is rotatably configured via a bearing 6 with a fixed shaft 5 fixed to a housing 100 as a central axis, and supports the other end (end at a side opposite to the slider 2A) of the suspension 2B. Thus, each slider 2A can be traveled in a direction (X axis direction) of track width of the magnetic recording medium 200 in a plane parallel to a write surface of each magnetic recording medium 200 by the arm 3. The drive section 4 is a power source for pivoting the arm 3, and includes a voice coil motor or the like.

The magnetic recording medium 200 is supported rotatably in a direction approximately perpendicular to an X axis direction with a spindle motor 7 fixed to the housing 100 as a center. Thus, write of information is performed into the magnetic recording medium 200, or read of written information is performed through rotation of the magnetic recording medium 200 and travel of the slider 2A.

Figure 2:
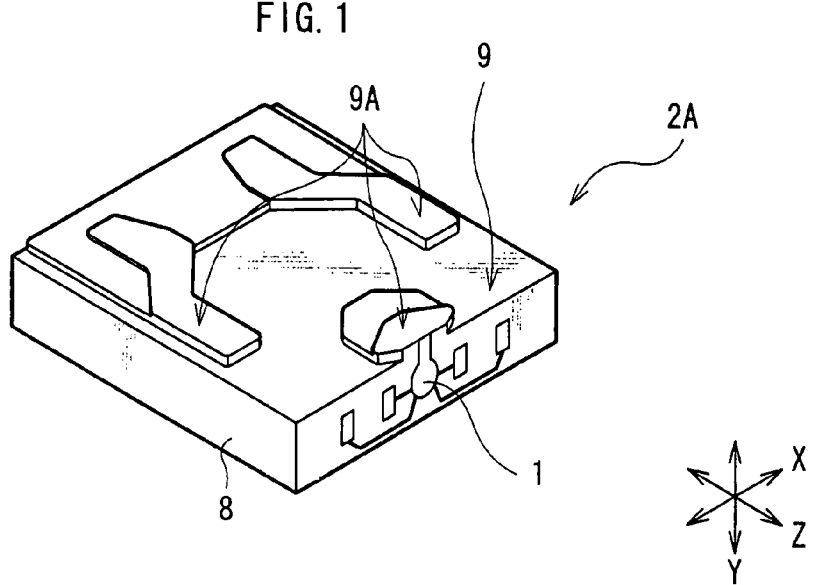
FIG. 2 is a perspective view showing a configuration of a slider in FIG. 1.

FIG. 2 shows an example of a configuration of the slider 2A shown in FIG. 1. The slider 2A has a block-like substrate 8 including a ceramic material such as AlTiC ($Al_2O_3$●TiC). The substrate 8 is formed, for example, in an approximately hexahedral shape, and one face of the six faces is disposed in a manner of closely facing a write surface of the magnetic recording medium 200. A surface facing the write surface of the magnetic recording medium 200 is an air bearing surface (air bearing surface) 9 on which rails 9A are provided, which generate lift due to an air stream in a direction (Z axis direction) of displacement of the magnetic recording medium 200 produced between the write surface and the air bearing surface 9 when the magnetic recording medium 200 is rotated.

FIG. 2 illustrates a case that the rails 9A are provided in a central portion in an X axis direction at an inflow side of the air stream in the slider 2A, and in both ends in the X axis direction at an outflow side of the air stream in the slider 2A respectively.

When the magnetic recording medium 200 is rotated, a certain gap is formed between the air bearing surface 9 and the magnetic recording medium 200 by the lift due to the air stream in the Z axis direction produced between the write surface and the air bearing surface 9.

Figure 3:
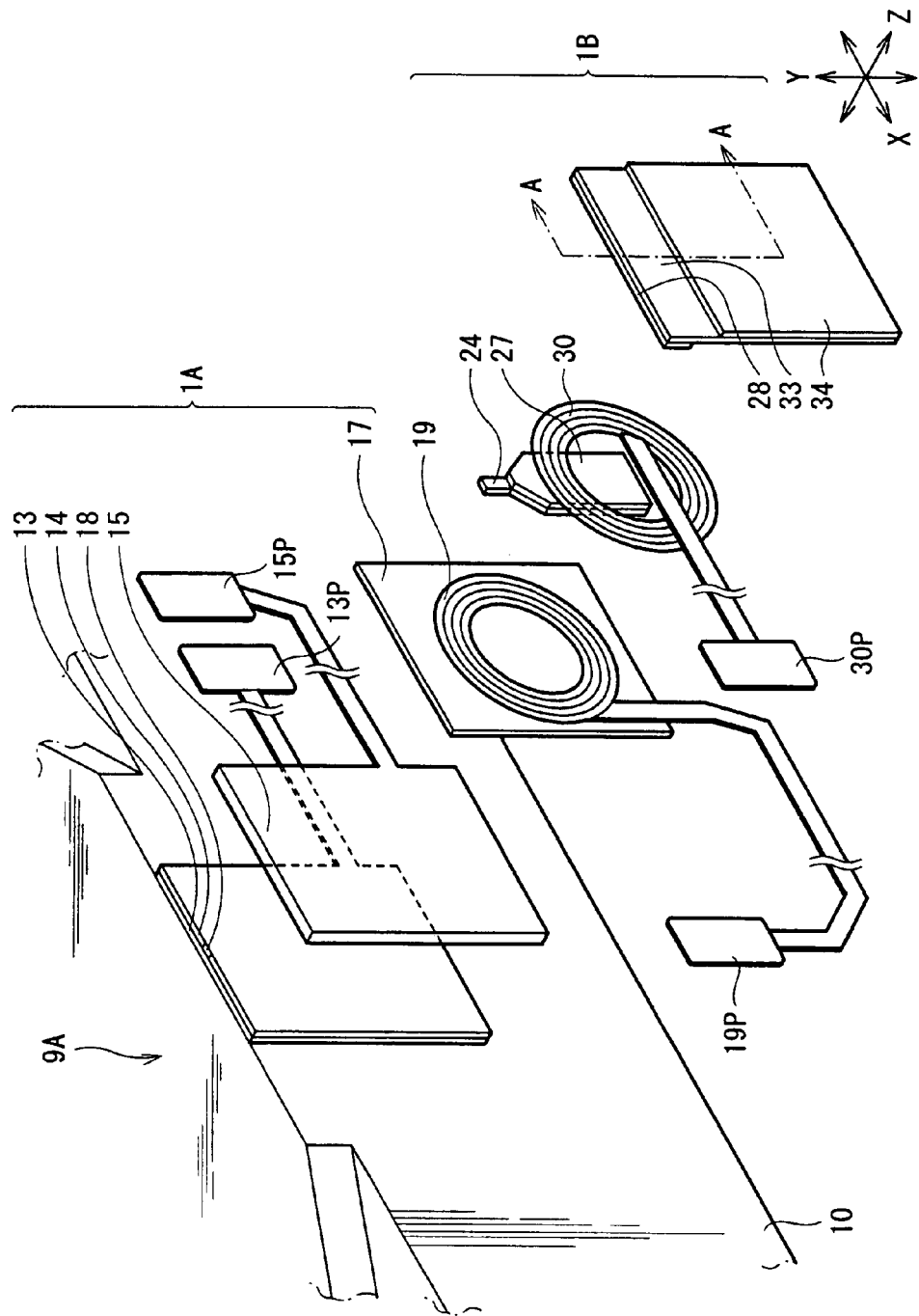
FIG. 3 is a perspective view showing a configuration of a thin film magnetic head in FIG. 2 in an exploded manner.
Figures 4A, 4B:
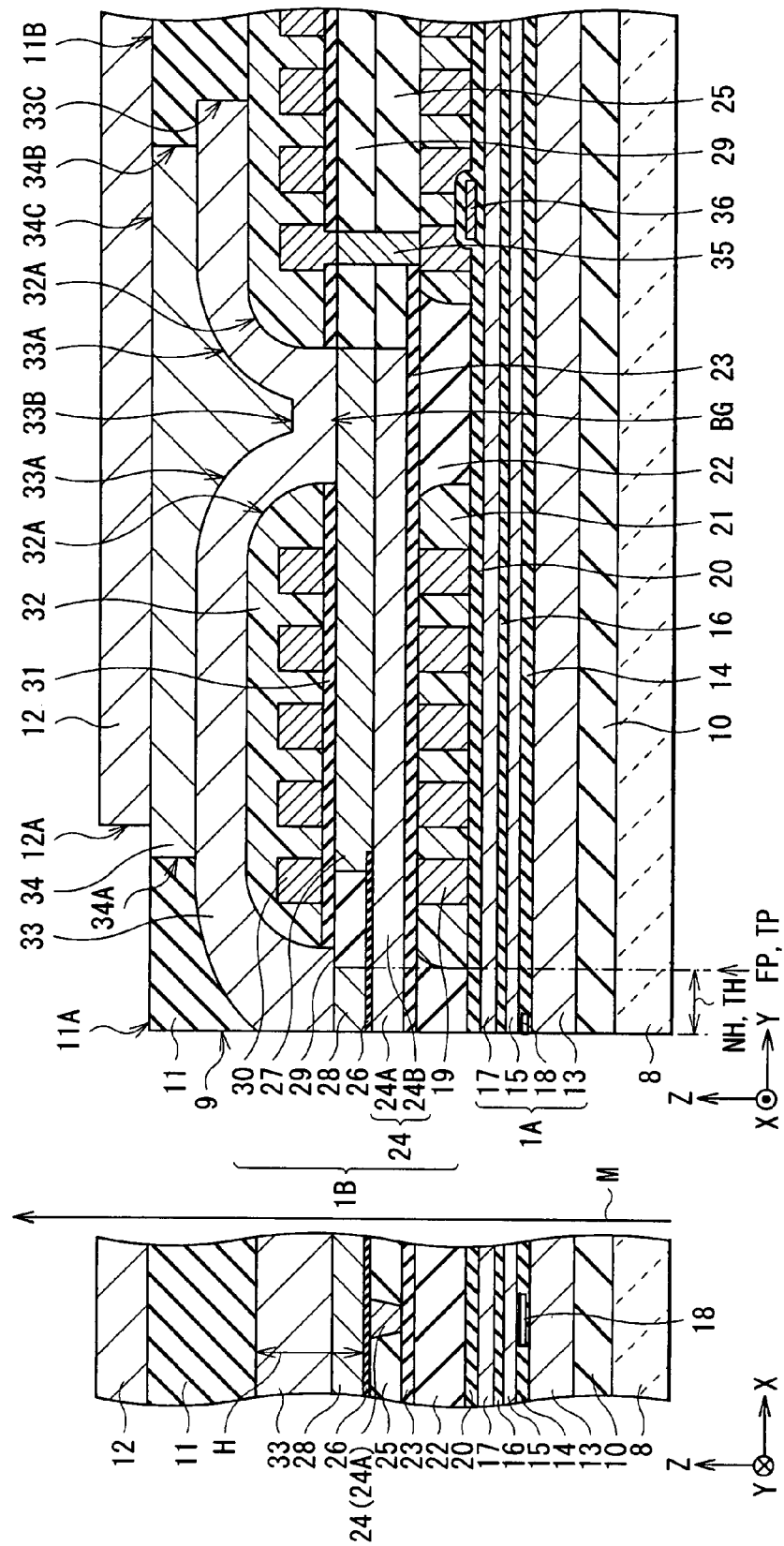
FIG. 4A is a planar configuration view showing part of a portion exposed on an air bearing surface of the thin film magnetic head of FIG. 3.
FIG. 4B is a sectional configuration view in an A-A arrow direction of the thin film magnetic head of FIG. 3.

As shown in FIG. 2, the thin film magnetic head 1 is provided on a surface on a trailing side of the substrate 8 with respect to the air bearing surface 9. FIG. 3 perspectively shows an example of a configuration of the thin film magnetic head 1 in an exploded manner. FIG. 4A shows part of a portion exposed on the air bearing surface 9 in the thin film magnetic head 1 of FIG. 3 in an expanded manner, and FIG. 4B shows a sectional configuration in an A-A arrow direction of FIG. 3. The thin film magnetic head 1 performs magnetic processing to the magnetic recording medium 200, and is a composite head that can perform both write processing and read processing as the magnetic processing.

In the thin film magnetic head 1, for example, an insulating layer 10, a read head section 1A for reading magnetic information written in the magnetic recording medium 200 using the magneto-resistive (MR) effect, a write head section 1B for write in a perpendicular write method, an insulating layer 11, and a thermal expansion suppression layer 12 are stacked in this order on the substrate 8. In FIG. 3, the insulating layer 11 and the thermal expansion suppression layer 12 are omitted.

The insulating layer 10 includes a nonmagnetic insulative material such as aluminum oxide (for example, $Al_2O_3$) or aluminum nitride (for example, AlN). The insulating layer 11 and the thermal expansion suppression layer 12 are described in detail later.

As shown in FIG. 3, and FIGS. 4A and 4B, for example, the read head section 1A is in a structure where a lower lead shield layer 13, a shield gap film 14, an upper first lead shield layer 15, an isolation layer 16, and an upper second lead shield layer 17 are stacked in this order on the insulating layer 10. An MR element 18 is buried in the shield gap film 14 in a manner of being exposed on the air bearing surface 9.

The lower lead shield layer 13 and the upper first lead shield layer 15 are provided to prevent the MR element 18 from being influenced by an unnecessary magnetic field respectively, and, for example, include a magnetic metal material such as nickel-iron alloy (NiFe). The lower lead shield layer 13 and the upper first lead shield layer 15 are formed extendedly in a Y axis direction (backward) from the air bearing surface 9, and one end is exposed on the air bearing surface 9 in each of them. That is, the lower lead shield layer 13 and the upper first lead shield layer 15 are oppositely disposed so as to sandwich the MR element 18 in a stacked direction (Z axis direction).

The lower lead shield layer 13 and the upper first lead shield layer 15 have, for example, a planar shape of rectangle as shown in FIG. 3. A shape of each of the lower lead shield layer 13 and the upper first lead shield layer 15 is not limited to the above shape. For example, they may have a planar shape of approximate battledore in which width in an X axis direction at a side of the air bearing surface 9 is narrower than width in the X axis direction of a portion retracted from the air bearing surface 9. Alternatively, for example, they may have notches from a central portion in the X axis direction in an area facing the magnetic recording medium 200 to both side faces perpendicular to the X axis direction of the magnetic recording medium 200. Moreover, in consideration of improving stability of a magnetic domain structure, it is preferable that width in the X axis direction is equal to width in a Y direction of them in sections parallel to an XY plane of the lower lead shield layer 13 and the upper first lead shield layer 15, or larger than the relevant width.

The shield gap film 14 is provided to electrically isolate the MR element 18 from surroundings, and, for example, includes a nonmagnetic insulative material such as aluminum oxide or aluminum nitride. The isolation layer 16 includes, for example, a nonmagnetic insulative material such as aluminum oxide or aluminum nitride. When the MR element 18 is in a configuration of a CIP (Current in Plane) type, the isolation layer 16 may include a metal material.

The upper second lead shield layer 17 is provided to absorb an unnecessary magnetic flux emitted from a lower thin film coil 19 and a magnetic pole layer 24, and prevent the unnecessary main magnetic flux from entering into the read head section 1A, and includes a magnetic metal material such as nickel-iron alloy (NiFe). The upper second lead shield layer 17 has, for example, a rectangular, planar shape as shown in FIG. 3. A shape of the upper second lead shield layer 17 is not limited to the above shape. For example, it may have a planar shape of approximate battledore, or may have notches from a central portion in the X axial direction in an area facing the magnetic recording medium 200 to both side faces perpendicular to the X axis direction of the magnetic recording medium 200.

The MR element 18 is a magneto-resistive effect element configured such that it has a stacked structure including a free magnetization layer of which the magnetization direction is changed depending on a signal magnetic field from the magnetic recording medium 200, and a sense current flows in a stacked direction, and for example, performs magnetic processing (read processing) using a giant magneto-resistive (GMR) effect or a tunneling magneto-resistive (TMR) effect. As an MR element using the GMR effect, an element of CIP (Current in Plane) type or CPP (Current Perpendicular to Plane) type is given.

Furthermore, the lower lead shield layer 13 is connected to an electrode pad 13P, and the upper first lead shield layer 15 is connected to an electrode pad 15P, so that the lower lead shield layer 13 and the upper first lead shield layer 15 further act as current paths for flowing a current to the MR element 18. Thus, the read head section 1A reads write information using change in electric resistance of the MR element 18 depending on the signal magnetic field from the magnetic recording medium 200.

The electrode pads 14P and 16P are configured by copper (Cu), gold (Au) or the like, and provided on the insulating layer 11 as described later (see FIGS. 7 and 8).

Next, a configuration of the write head section 1B is described. As shown in FIG. 3 and FIGS. 4A and 4B, the write head section 1B is formed on the upper second lead shield layer 17, which is a perpendicular write head, or so-called shield head, in which, for example, a lower thin film coil 19 buried in insulating layers 20 to 23, a main magnetic pole layer 24 of which the periphery is filled with an insulating layer 25, a gap layer 26, an auxiliary magnetic layer 27 of which the periphery is filled by a nonmagnetic layer 29 and a write shield layer 28, an upper thin film coil 30 buried in insulating layers 31 and 32, a first return yoke layer 33, and a second return yoke layer 34 are stacked in this order. Furthermore, as the lower thin film coil 19 is connected to a pad 19P, and the upper thin film coil 30 is connected to a pad 30P, a current is supplied to each of the lower thin film coil 19 and the upper thin film coil 30 through each of the pads 19P and 30P.

The lower thin film coil 19 generates a leakage prevention magnetic flux to prevent leakage (unintentional spread of a magnetic flux for write to the read head section 1A) of a magnetic flux for write generated in the upper thin film coil 30. The lower thin film coil 19 is configured by a highly conductive material such as copper (Cu), and as shown in FIG. 4B, provided in a position retracted from the air bearing surface 9, and has a spiral structure wound with the back gap BG as a center. While the number of turns of the lower thin film coil 19 can be optionally set, the number of turns preferably corresponds to the number of turns of the upper thin film coil 30.

The insulating layer 20, is configured by a nonmagnetic insulative material such as aluminum oxide or aluminum nitride, and formed on the second lead shield layer 17. The insulating layer 21 includes a nonmagnetic insulative material such as a photoresist (photosensitive resin) exhibiting fluidity by being heated, or spin on glass (SOG), which is formed on the insulating layer 20 filling the periphery of the lower thin film coil 19. The insulating layer 22, for example, includes the same material as that of the insulating layer 20, filling the periphery of the insulating layer 21 while being exposed on the air bearing surface 9. The insulating layer 23, for example, includes the same material as that of the insulating layer 20, and formed over a top of the lower thin film coil 19, top of the insulating layer 21, and top of the insulating layer 22. Thus, the lower thin film coil 19 is electrically isolated from surroundings by the insulating layers 20 to 23.

The main magnetic pole layer 24 is a portion for emitting major magnetic fluxes, and includes a magnetic material having a high saturation magnetic flux density such as iron alloy. As the iron alloy, for example, iron-cobalt alloy (FeCo) or cobalt-iron-nickel alloy (CoFeNi) is given.

Figure 5:
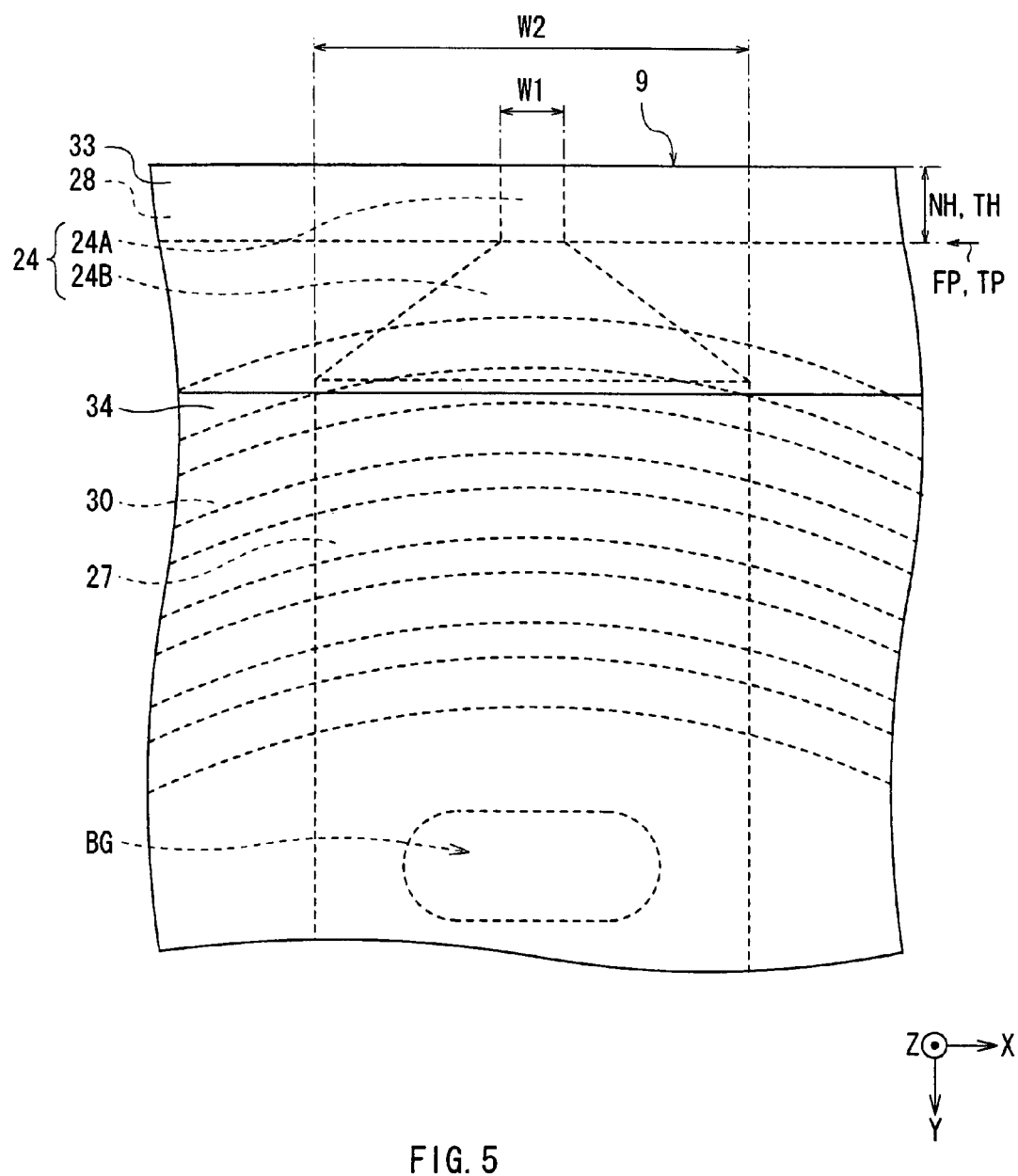
FIG. 5 is a planar configuration view showing an example of a main magnetic pole layer and the like in FIG. 4B.

As shown in FIG. 4B and FIG. 5, the main magnetic pole layer 24 is formed in a manner of extending from the air bearing surface 9 to the back gap BG (described later), and one end of the main magnetic pole layer 24 is exposed on the air bearing surface 9. The main magnetic pole layer 24 has, for example, a planar shape of approximate battledore, and includes a front portion 24A extending in the Y axis direction from the air bearing surface 9, and a rear portion 24B being connected to the front portion 24A and extending in the Y axis direction from the front portion 24A. The "connected" condition means a magnetically conductible condition.

The front portion 24A is substantially a portion for emitting a magnetic flux (so-called magnetic pole), and has a certain width W1 for defining write track width. The rear portion 24B is a portion for supplying a magnetic flux to the front portion 24A, and has a width W2 larger than the width in the X axis direction of the front portion 24A. The width W2 in the X axis direction of the rear portion 24B is, for example, constant in a portion away from the front portion 24A, and gradually reduced as it is closer to the front portion 24A in a portion near the front portion 24A of the rear portion 24B. A position from which width of the front portion 24A is increased from W1 to W2 is a flare point FP, and a distance between the air bearing surface 9 and the flare point FP is neck height NH.

Figure 6:
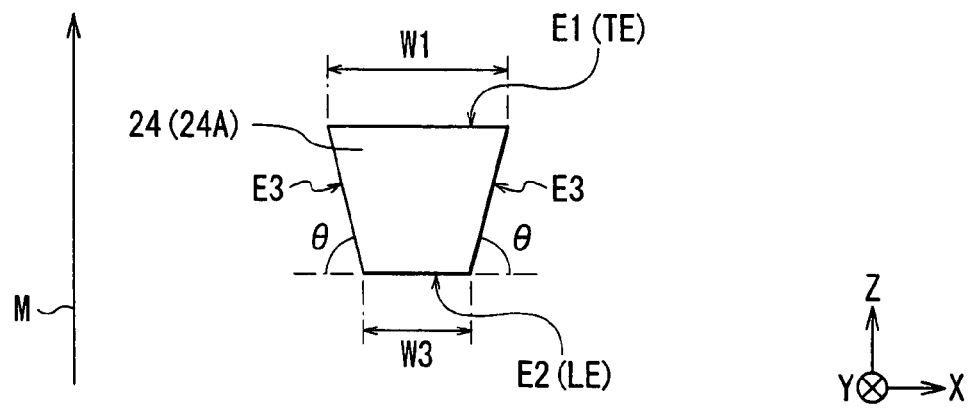
FIG. 6 is a side configuration view showing a portion exposed on the air bearing surface in the main magnetic pole layer in FIG. 4B in an exploded manner.

An end face of the front portion 24A on the air bearing surface 9 has, for example, as shown in FIG. 6, a reverse trapezoid shape with a long side situated at a trailing side and a short side situated at a leading side as an upper base and a lower base respectively. More specifically, the end face of the main magnetic pole layer 24 has a shape defined by an upper edge E1 (width W1) situated at the trailing side, a lower edge E2 (width W3) situated at the leading side, and two side edges E3, and the width W3 is smaller than the width W1. The upper edge E1 is substantially a write region (so-called trailing edge TE) of the main magnetic pole layer 24, and the width W1 of the edge is about 0.2 μm or less. A bevel angle θ, that is, an angle between an extending direction of the lower edge E2 and each side edge E3 can be optionally set within a range of less than 90 degrees.

The "trailing side" means a side at which a stream is flown out (a front side in the medium advance direction M), when a motion condition of the magnetic recording medium 200 travelling along a medium advance direction M (a direction in which the magnetic recording medium 200 relatively travels against the thin film magnetic head 1) is seen to be the stream, and means an upper side in a thickness direction (Z axis direction) herein. On the contrary, a side at which the stream is flown in (a rear side in the medium advance direction M) is called "leading side", and means a lower side in the thickness direction herein.

The insulating layer 25 is provided to electrically isolate the main magnetic pole layer 24 from surroundings, and includes a nonmagnetic insulative material such as aluminum oxide ($Al_2O_3$) or aluminum nitride (AlN). The insulating layer 25 is provided on the insulating layer 23, and fills the periphery of the main magnetic pole layer 24. In the insulating layer 25, a U-shape groove is formed from the air bearing surface 9 to an end at a side of the air bearing surface 9 of the nonmagnetic pole layer 29, and the front portion 24A of the main magnetic pole layer 24 is formed within the groove.

The gap layer 26 includes a nonmagnetic material such as alumina, and is formed in a manner of extending from the air bearing surface 9 to a front end of the auxiliary magnetic pole layer 27 while being contacted to a top of the main magnetic pole layer 24. In the gap layer 26, a portion sandwiched by the main magnetic pole layer 24 and the write shield layer 28 is a magnetic gap for magnetically isolating the layers from each other, and about 0.03 μm to 0.1 μm in thickness.

The auxiliary magnetic pole layer 27 is a portion for accommodating major magnetic fluxes, and for example, includes a magnetic material having a low saturation magnetic flux density compared with the magnetic material configuring the main magnetic pole layer 24. As shown in FIG. 4B and FIG. 5, the auxiliary magnetic pole layer 27 is formed in a manner of extending from a position retracted from the air bearing surface 9 to the back gap BG, and for example, has a planar shape of rectangle having a thickness W2 as the rear portion 24B of the main magnetic pole layer 24. Moreover, the auxiliary magnetic pole layer 27 is magnetically connected to the main magnetic pole layer 24, and disposed on a trailing side (upper side in FIG. 4B) of the main magnetic pole layer 24. That is, the main magnetic pole layer 24 and the auxiliary magnetic pole layer 27 have a top yoke structure respectively. The auxiliary magnetic pole layer 27 may be disposed on a leading side of the main magnetic pole layer 24. Moreover, the auxiliary magnetic pole layer 27 has a large thickness compared with the main magnetic pole layer 24 to obtain larger capacity for accommodating magnetic fluxes (so-called magnetic volume), the thickness being about 0.5 μm to 1 μm.

The write shield layer 28 absorbs spread components of magnetic fluxes to be conducted into the magnetic recording medium 200 from the main magnetic pole layer 24, so that (1) magnetic gradient in perpendicular magnetic field is increased, (2) write width is reduced, and (3) an oblique magnetic field component is included in a perpendicular magnetic field. The write shield layer 28 is arranged in an area in front of the auxiliary magnetic pole layer 27 in the same level as a level of the layer 27, and extends from the air bearing surface 9 to a position in front of the auxiliary magnetic pole layer 27 while being isolated from the main magnetic pole layer 24 by the gap layer 26. The write shield layer 28 includes a magnetic material such as permalloy or iron-cobalt alloy, and has a planar shape of rectangle having a large width W4 compared with the width W2 of the auxiliary magnetic pole layer 27 (see FIG. 5 and FIG. 7). A nonmagnetic layer 29 for defining a throat height zero position TP is adjacent to a rear end of the write shield layer 28. That is, the write shield layer 28 substantially plays a role of defining the throat height zero position TP at the rear end.

The nonmagnetic layer 29 defines the throat height zero position TP at the most front end, and includes a nonmagnetic insulative material such as aluminum oxide ($Al_2O_3$) or aluminum nitride (AlN), or a nonmagnetic conductive material such as ruthenium. A distance between the air bearing surface 9 and the throat height zero position TP is throat height TH. FIG. 4B and FIG. 5 show a case that the throat height zero position TP corresponds to the flare point FP.

The nonmagnetic layer 29 is arranged in an area in front of the auxiliary magnetic pole layer 27 in the same level as a level of the layer 27, and for example, provided between the auxiliary magnetic pole layer 27 and the write shield layer 28. Here, for example, the nonmagnetic layer 29 is arranged not only in the area in front of the auxiliary magnetic pole layer 27 in the same level as a level of the layer 27, but also arranged so as to enclose the periphery of the auxiliary magnetic pole layer 27.

The upper thin film coil 30 generates a magnetic flux for write. The upper thin film coil 30 is configured by a highly conductive material such as copper (Cu), and as shown in FIG. 4B, provided in a position retracted from the air bearing surface 9, and has a spiral structure wound with the back gap BG as a center. The upper thin film coil 30 is electrically connected to the lower thin film coil 19 via a via 35, so that a current flows in a direction opposite to a direction in which a current flows in the lower thin film coil 19. While the number of turns of the lower thin film coil 19 can be optionally set, the number of turns preferably corresponds to the number of turns of the upper thin film coil 30.

The insulating layer 31 is a base of the upper thin film coil 30, and includes the same nonmagnetic insulative material as that of the insulating layer 20. The insulating layer 32 covers the upper thin film coil 30 with the insulating layer 31, and includes the same nonmagnetic insulative material as that of the insulating layer 21. The insulating layers are arranged such that they do not plug the back gap BG, and connected to the nonmagnetic layer 29. The most front ends of the insulating layers 31, 32 are retracted from the most front end of the nonmagnetic layer 29. A portion near an edge of the insulating layer 32 forms a rounded, steep slope 32A. The first return yoke layer 33 absorbs a magnetic flux after write (magnetic flux used for write processing in the recording medium 200), and resupplies the magnetic flux to the main magnetic pole layer 24 and the auxiliary magnetic pole layer 27, thereby magnetic fluxes are circulated between the thin film magnetic head 1 and the recording medium 200. The first return yoke layer 33 includes a magnetic metal material (for example, permalloy) having a high saturation magnetic flux density such as iron alloy. The first return yoke layer 33 has, for example, a planar shape of rectangle as shown in FIG. 3 and FIG. 7. A shape of the first return yoke layer 33 is not limited to the above shape. For example, it may have a planar shape of approximate battledore, or for example, have notches from a central portion in the X axis direction in an area facing the magnetic recording medium 200 to both side faces perpendicular to the X axis direction of the magnetic recording medium 200. Moreover, the first return yoke layer 33 extends from the air bearing surface 9 to a middle position (end face 33C) between the back gap BG and a portion most distant from the air bearing surface 9 in the insulating layer 32 so that it covers part of the insulating layer 32. Moreover, the first return yoke layer 33 is set on the write shield layer 28 and connected thereto at a side of the air bearing surface 9, and connected to the auxiliary magnetic pole layer 27 through the back gap BG. That is, the first return yoke layer 33 is provided on a surface including the insulating layer 32 and a portion facing the back gap BG in the auxiliary magnetic pole layer 27, and a recess 33B having a steep slope 33A is formed in a portion corresponding to an area directly above the back gap BG in the first return yoke layer 33.

The second return yoke layer 34 acts as a channel of a magnetic flux absorbed by the first return yoke layer 33 and the write shield layer 28, and for example, includes a magnetic metal material having a high saturation magnetic flux density such as iron alloy as the first return yoke layer 33. The second return yoke layer 34 extends in the Y axis direction from a position retracted from the air bearing surface 9, and for example, as illustrated in FIG. 4B, it extends from a position (end face 34A) retracted from the write shield layer 28 to a position (end face 34C) near the end face 33C of the first return yoke layer 33. Moreover, the second return yoke layer 34 is formed so as to fill the recess 33B of the first return yoke layer 33, and has a flat surface 34C in at least an area directly above the recess 33B. FIG. 4B illustrates a case that the flat surface 34C is formed not only directly above the recess 33B, but also over the whole top of the second return yoke layer 34. The flat surface 34C is formed by planarization using CMP (Chemical Mechanical Polishing) or the like.

In the embodiment, a heating element 36 is buried in a region away from the air bearing surface 9, for example, as illustrated in FIG. 4B, in a position a predetermined distance away from the air bearing surface 9 in the insulating layer 20. The heating element 36 is a body to actively produce thermal protrusion in the main magnetic pole layer 24 by heating the heating element itself, and formed by a heater coil or the like.

Next, the insulating layer 11 and the thermal expansion suppression layer 12 are described.

The insulating layer 11 includes a nonmagnetic insulative material, for example, at least one of aluminum oxide (for example, $Al_2O_3$) and silicon oxide (for example, $SiO_2$). The insulating layer 11 is formed so as to cover the peripheries of the first return yoke layer 33 and the second return yoke layer 34, and specifically, as shown in FIG. 4B and FIG. 7, cover the edge 33C at a side opposite to the air bearing surface 9 of the first return yoke layer 33, or the edge 34A at a side of the air bearing surface 9 and the edge 34B at a side opposite to the air bearing surface 9 of the second return yoke layer 34. FIG. 7 is a side view when the slider 2A of FIG. 2 is seen from the trailing side, and dashed lines in the figure schematically show portions being not exposed on a side face at the trailing side. Moreover, for example, as shown in FIG. 4B, the insulating layer 11 has a flat surface 11A on a top at a side of the air bearing surface 9, and has a flat surface 11B on a top at a side opposite to the air bearing surface 9. The flat surfaces 11A and 11B are formed with being planarized by CMP or the like, and preferably situated in the same plane as the flat surface 34C of the second return yoke layer 34 as shown in FIG. 4B.

The insulating layer 11 may cover the top of the second return yoke layer 34. However, in this case, a top of the insulating layer 11 is preferably flat. In thickness of the insulating layer 11, thickness directly above the second return yoke layer 34 is preferably small.

Figure 7:
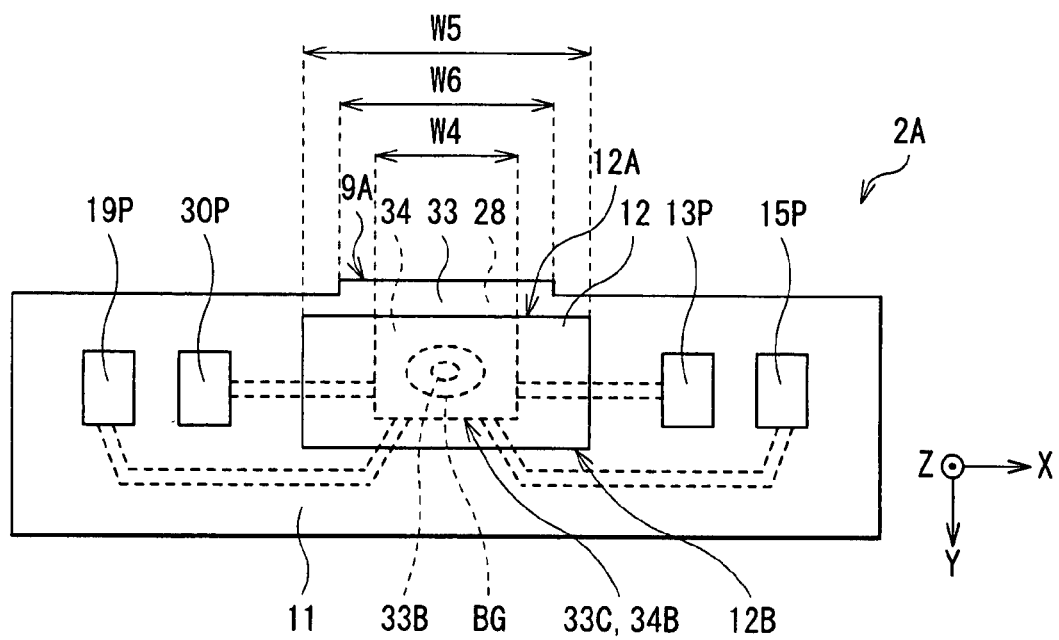
FIG. 7 is a side configuration view showing a portion exposed on the air bearing surface in the slider of FIG. 2.

When the insulating layer 11 is formed over the whole end face at the trailing side of the slider 2A as shown in FIG. 7, it acts as an insulating layer for isolating the second return yoke layer 34 from the electrode pads 13P, 15P, 19P and 30P.

The thermal expansion suppression layer 12 includes a low thermal expansion material having a small thermal expansion coefficient and a large heat conductivity compared with the insulating layer 11, for example, at least one of silicon oxide, silicon carbide (SiC), silicon nitride (SiN), aluminum nitride, and aluminum carbide. The thermal expansion suppression layer 12 extends from a position retracted from the air bearing surface 9 backward, as shown in FIG. 4B. That is, the thermal expansion suppression layer 12 has a relatively depressed shape in the air bearing surface 9 in connection with the main magnetic pole layer 24. However, the thermal expansion suppression layer 12 is provided on at least the second return yoke layer 34. For example, as shown in FIG. 4B and FIG. 7, in the thermal expansion suppression layer 12, an edge 12A at a side of the air bearing surface 9 is provided on the second return yoke layer 34, and an edge 12B at a side opposite to the air bearing surface 9 is provided on the insulating layer 11. As illustrated in FIG. 7, preferably, the thermal expansion suppression layer 12 is in such a size that it covers all the first return yoke layer 33 and the second return yoke layer 34 (except for a region near the air bearing surface 9). Moreover, preferably, width W5 in the X axis direction of the thermal expansion suppression layer 12 is approximately equal to width W6 in the X axis direction of a portion provided near the air bearing surface 9 in the rail 9A, or larger than the width W6.

Figure 8:
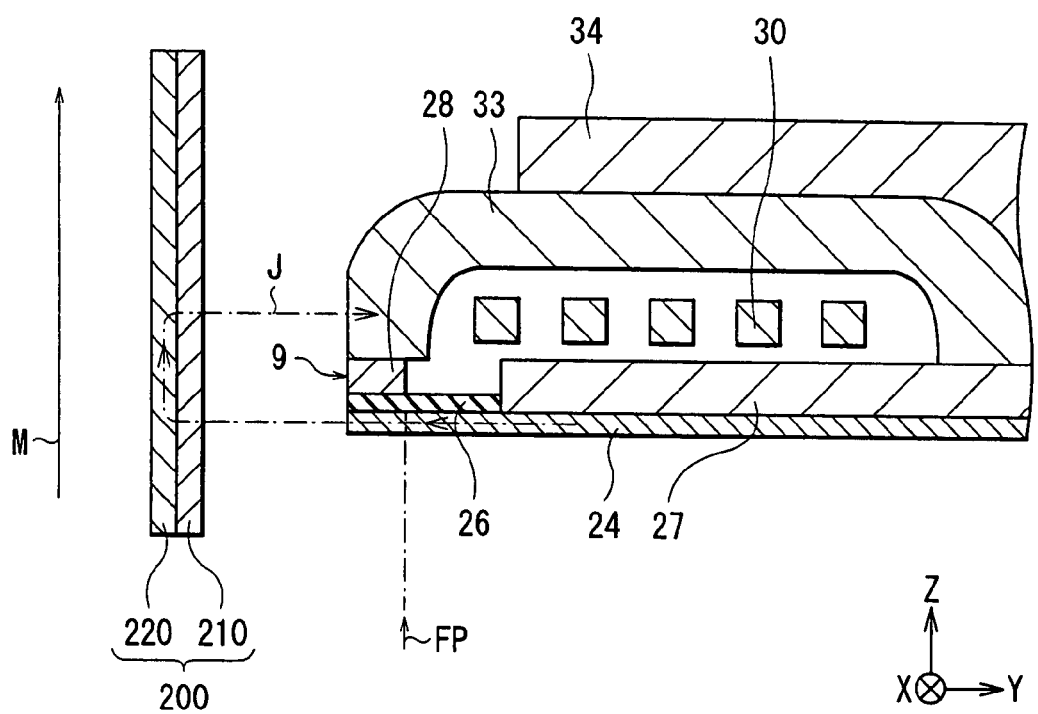
FIG. 8 is a sectional configuration view for explaining a relationship between the thin film magnetic head of FIG. 3 and a magnetic recording medium.
Figures 9A, 9B:
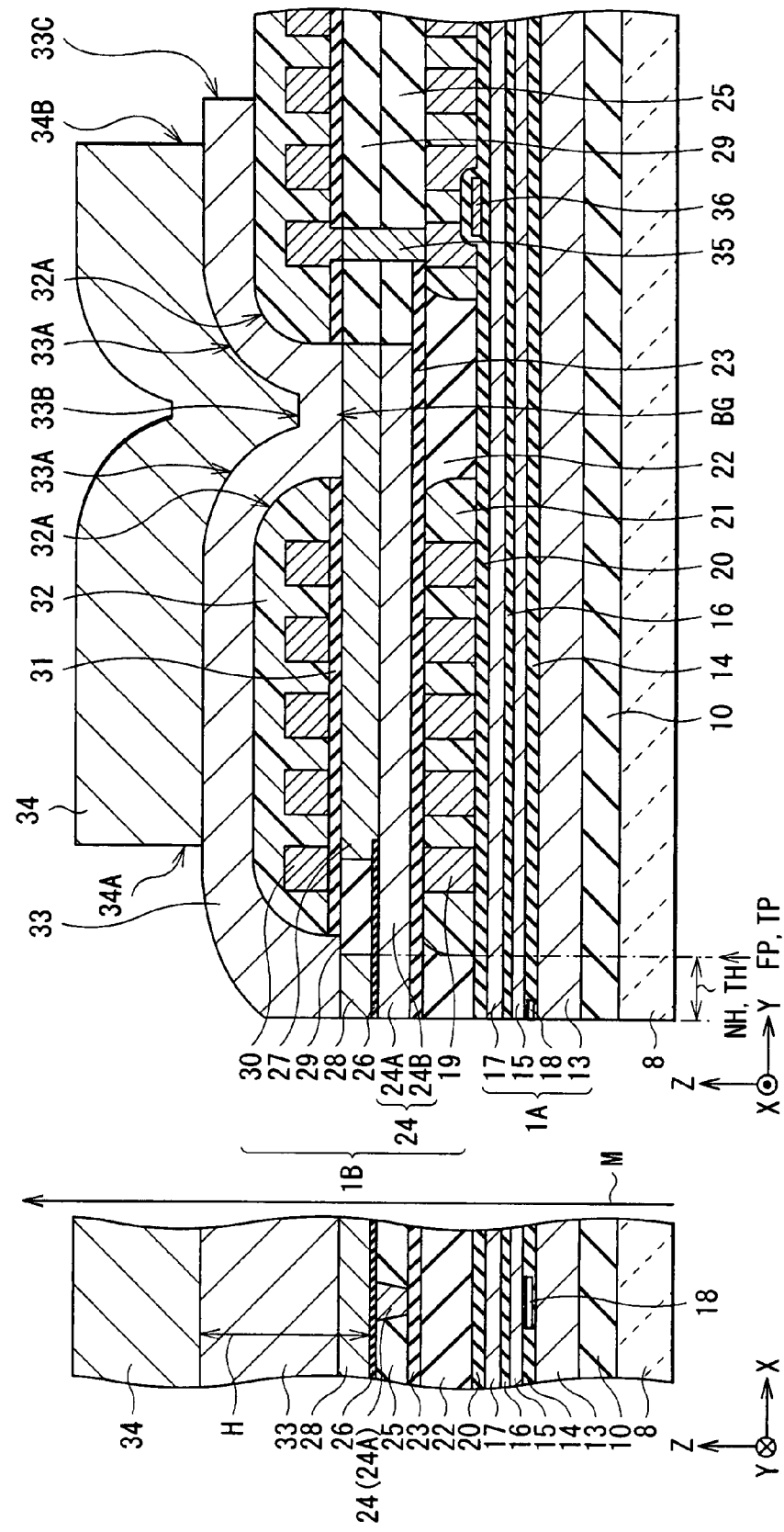
FIGS. 9a to 9b are sectional configuration views for explaining a manufacturing process of the thin film magnetic head in FIG. 1.

For example, as shown in FIG. 8, the magnetic recording medium 200 includes a magnetization layer 210 and a soft magnetic layer 220 disposed in the order from a side near the thin film magnetic head 1. The magnetization layer 210 can magnetically store information, and the soft magnetic layer 220 acts as a channel of a magnetic flux (so-called flux path) in the magnetic recording medium 200. This type of magnetic recording medium 200 is generally called double layer recording medium for perpendicular write. It is obvious that the magnetic recording medium 200 may include other layers in addition to the magnetization layer 210 and the soft magnetic layer 220.

Next, an example of a method of manufacturing the thin film magnetic head 1 is described. Hereinafter, description is made mainly on a method of forming the insulating layer 11 and the thermal expansion suppression layer 12 as one of peculiar points of the embodiment.

First, the insulating layer 10 to the insulating layer 32 are formed on the substrate 8. Then, a photoresist layer (not shown) is formed, the resist layer having an opening in an area extending in the Y axis direction from the air bearing surface 9 is formed, and then the first return yoke layer 33, for example, by plating with the photoresist layer as a mask (see FIGS. 9A and 9B). Then, a photoresist layer (not shown) is formed, the photoresist layer having an opening in an area extending in the Y axis direction from a position retracted from the air bearing surface 9, and then the second return yoke layer 34 is formed thick, for example, by plating with the photoresist layer as a mask (see FIGS. 9A to 9B).

Figures 10A, 10B:
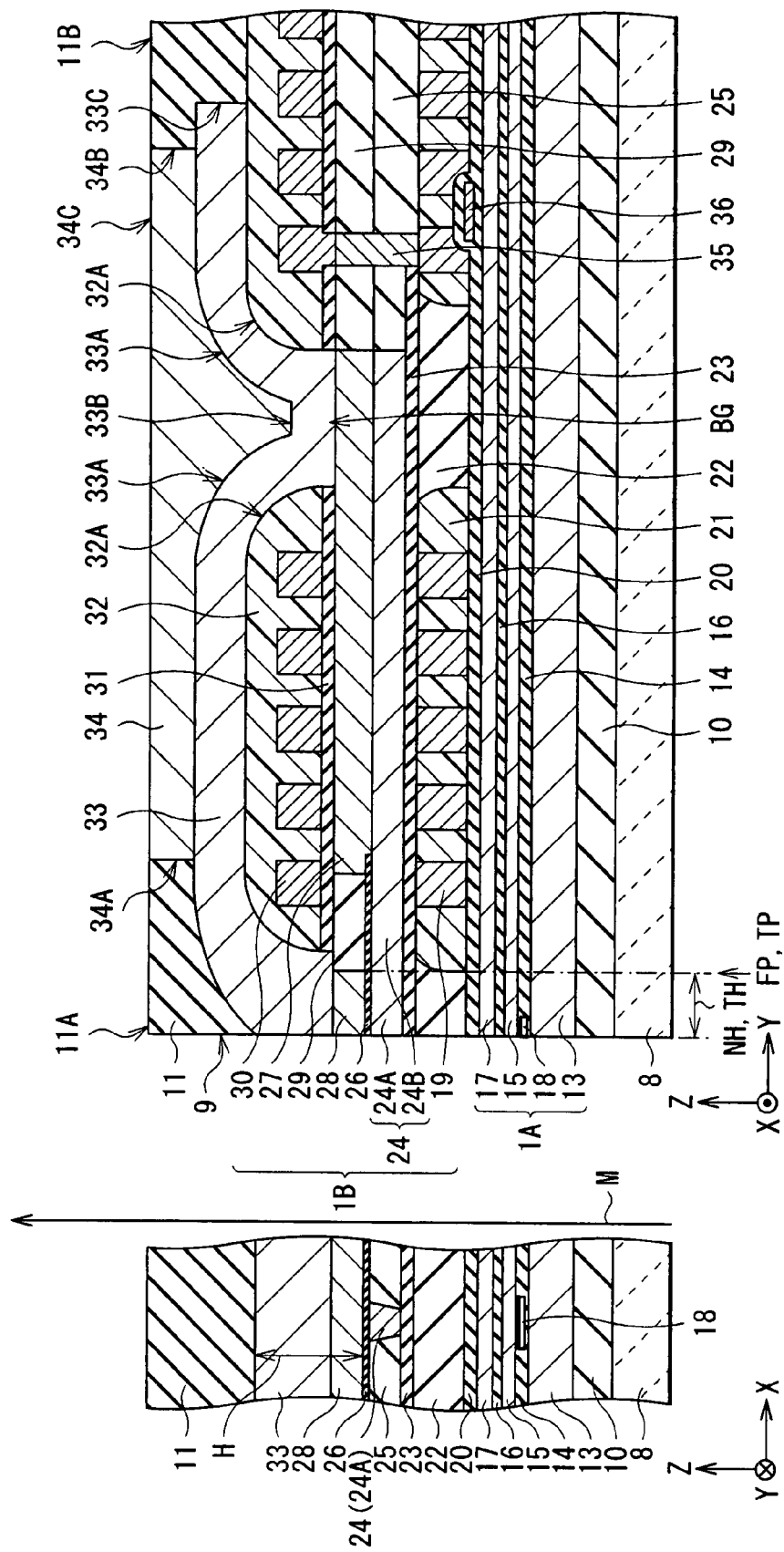
FIGS. 10a to 10b are sectional configuration views for explaining a step subsequent to a step of FIGS. 9a to 9b.
Figures 11A, 11B:
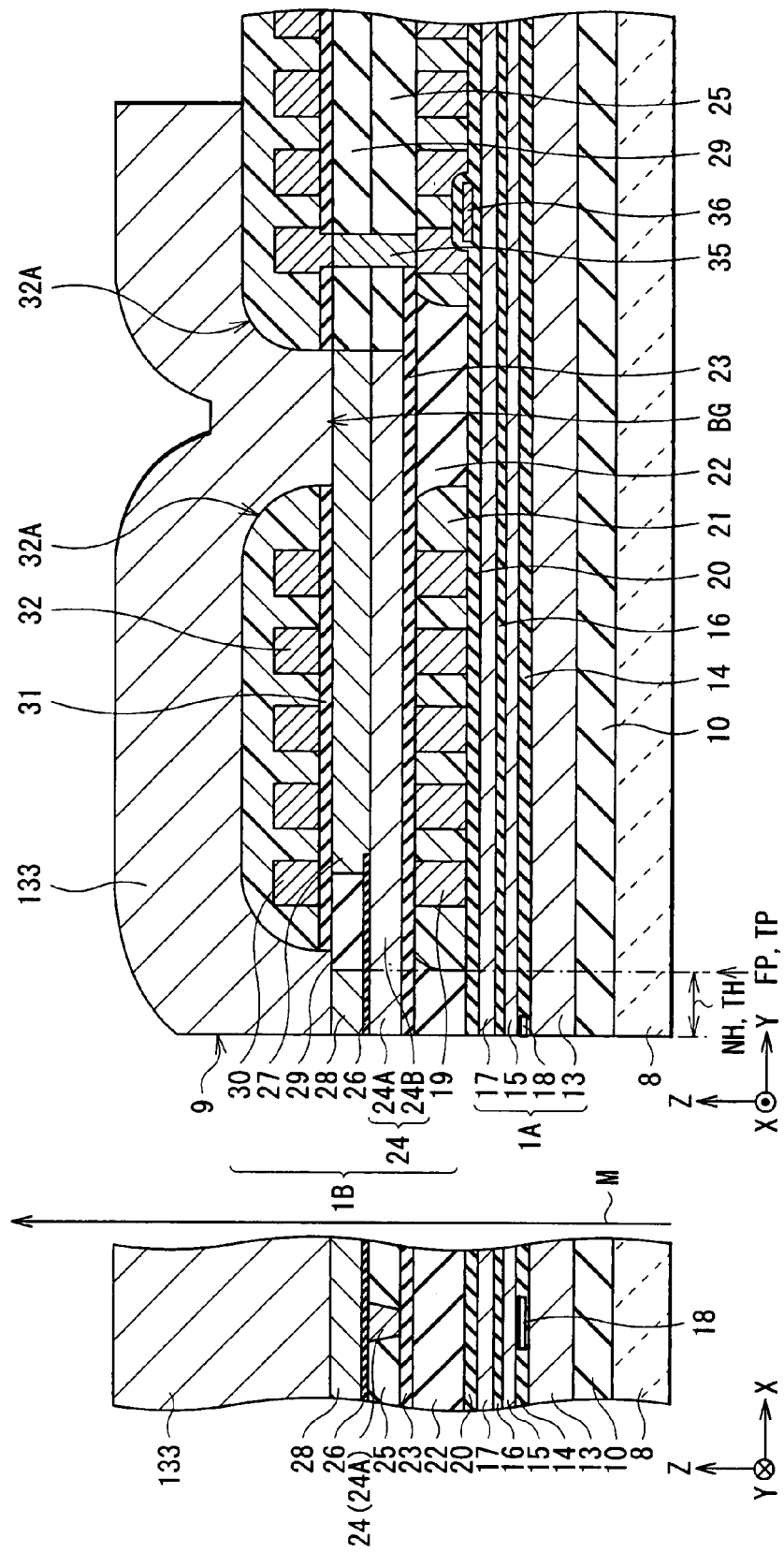
FIGS. 11a to 11b are sectional configuration views for explaining a manufacturing process of the thin film magnetic head according to a comparative example.
Figures 12A, 12B:
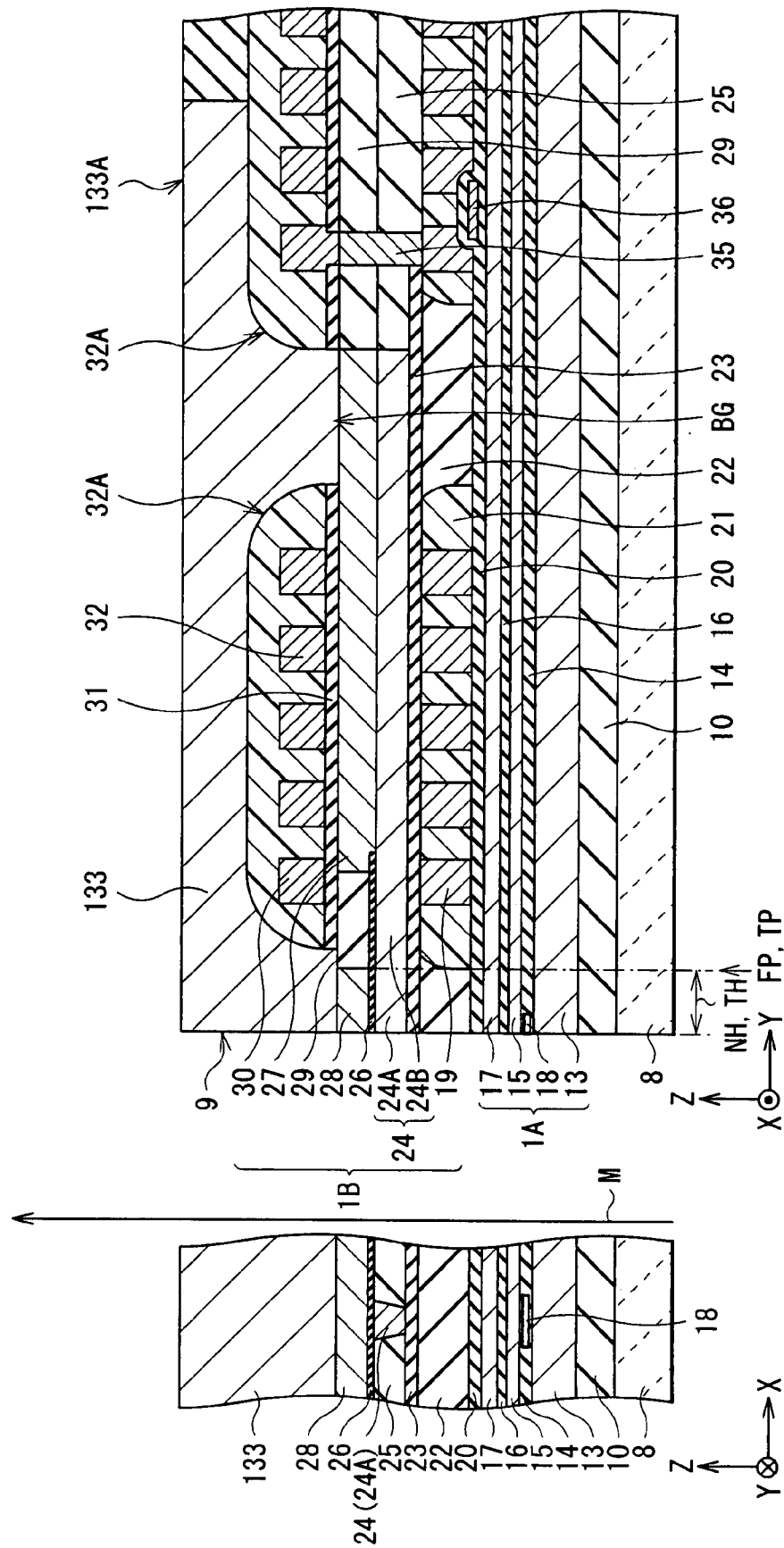
FIGS. 12a to 12b are sectional configuration views for explaining a step subsequent to a step of FIGS. 11a to 11b.

Next, the insulating layer 11 is formed so as to cover the whole surface including the end face 33C of the first return yoke layer 33 and end faces 34A and 34B of the second return yoke layer 34, and then a surface of the insulating layer 11 is polished using the CMP method until the second return yoke layer 34 has a predetermined thickness (see FIGS. 10A and 10B). Thus, the flat surface 34C is formed on the top of the second return yoke layer 34, in addition, the flat surfaces 11A and 11B are formed on the top of the insulating layer 11. In this case, since the flat surface 34C and the flat surfaces 11A and 11B are in the same plane, all the surfaces are evenly flat.

Next, a low thermal expansion material is deposited over all the planarized surfaces using, for example, a sputtering method, and then a mask layer (for example, a layer including an insulative material) having an opening in a side of the air bearing surface 9 is formed on the deposited low thermal expansion material. Then, a pattern of the mask layer is transferred to the deposited low thermal expansion material using a dry etching process such as RIE or ion milling with the mask layer as a mask (see FIG. 4B). Thus, the thermal expansion suppression layer 12 is formed.

Operation of the thin film magnetic head 1 is as follows. That is, in write of information, when a current flows from a not-shown external circuit into the lower thin film coil 19 and the upper thin film coil 30 of the write head section 1B, magnetic fluxes for write are generated. The magnetic fluxes are accommodated in the auxiliary magnetic pole layer 27 and the main magnetic pole layer 24, and then flow to the front portion 24A. At that time, since the magnetic fluxes are pinched at the flare point FP and thus condensed, they are finally concentrated near the front portion 24A. When the magnetic fluxes concentrated near the front portion 24A are emitted to the outside and thus a perpendicular magnetic field is generated, the magnetization layer of the magnetic recording medium 200 is magnetized by the perpendicular magnetic field. Therefore, information is magnetically written into the magnetic recording medium 200.

In this case, since spread components of the magnetic fluxes emitted from the main magnetic pole layer 24 are absorbed by the write shield layer 28, a gradient of the perpendicular magnetic field is increased. At that time, the magnetic fluxes absorbed by the write shield layer 28 are resupplied to the main magnetic pole layer 24 via the first return yoke layer 33 and the second return yoke layer 34.

The magnetic fluxes emitted from the main magnetic pole layer 24 to the magnetic recording medium 200 magnetizes the magnetization layer 210 of the magnetic recording medium 200, and then they are absorbed by the first return yoke layer 33 via the soft magnetic layer 220. At that time, part of the magnetic fluxes is absorbed also by the write shield layer 28. The magnetic fluxes absorbed by the write shield layer 28 and the first return yoke layer 33 are still resupplied to the main magnetic pole layer 24. Thus, since the magnetic fluxes are circulated between the write head section 1B and the magnetic recording medium 200, a magnetic circuit is established.

On the other hand, in read of information, when a sense current flows into the MR element 18 of the read head section 1A, a resistance value of the MR element 18 is changed depending on a signal magnetic field for read from the magnetic recording medium 200. Such change in resistance is detected as change in voltage, thereby information written in the magnetic recording medium 200 is magnetically read.

In the embodiment, two yoke layers (the first return yoke layer 33 and the second return yoke layer 34) are formed on the trailing side of the main magnetic pole layer 24. Thus, a material of each yoke layer can be selected in accordance with a purpose. For example, in the light of simplification of a manufacturing process, the same material is preferably used for the respective yoke layers. Moreover, for example, in the light of avoiding saturation of the back gap BG which is saturated most easily, and suppressing heat generation due to eddy current loss, it is preferable that the first return yoke layer 33 includes a magnetic metal material having a high saturation magnetic flux density, and the second return yoke layer 34 includes a material having a large specific resistance ρ on the assumption that the material has a relatively high saturation magnetic flux density (for example, CoFeNi, or FeNi having a large elemental ratio of Fe).

In the embodiment, since the recess 33B formed in the first return yoke layer 33 is filled by the second return yoke layer 34, the thermal expansion suppression layer 12 can be provided on a flat surface. Thus, possibility of a crack in the thermal expansion suppression layer 12 can be eliminated. Moreover, since there is no possibility that a mask layer used in formation of the thermal expansion suppression layer 12 is remained in an area where the mask layer is normally to be removed, there is also no possibility of unnecessary remainder of the thermal expansion suppression layer 12, or an unpredictable residue of the mask layer. Thus, when a protective film is formed on the thermal expansion suppression layer 12, possibility of a crack can be eliminated in a portion where the protective film is formed on the unnecessary remainder of the thermal expansion suppression layer 12 or the residue of the mask layer. As a result, reduction in reliability, or variation in thermal protrusion for each element due to the crack can be suppressed.

Figures 13A, 13B:
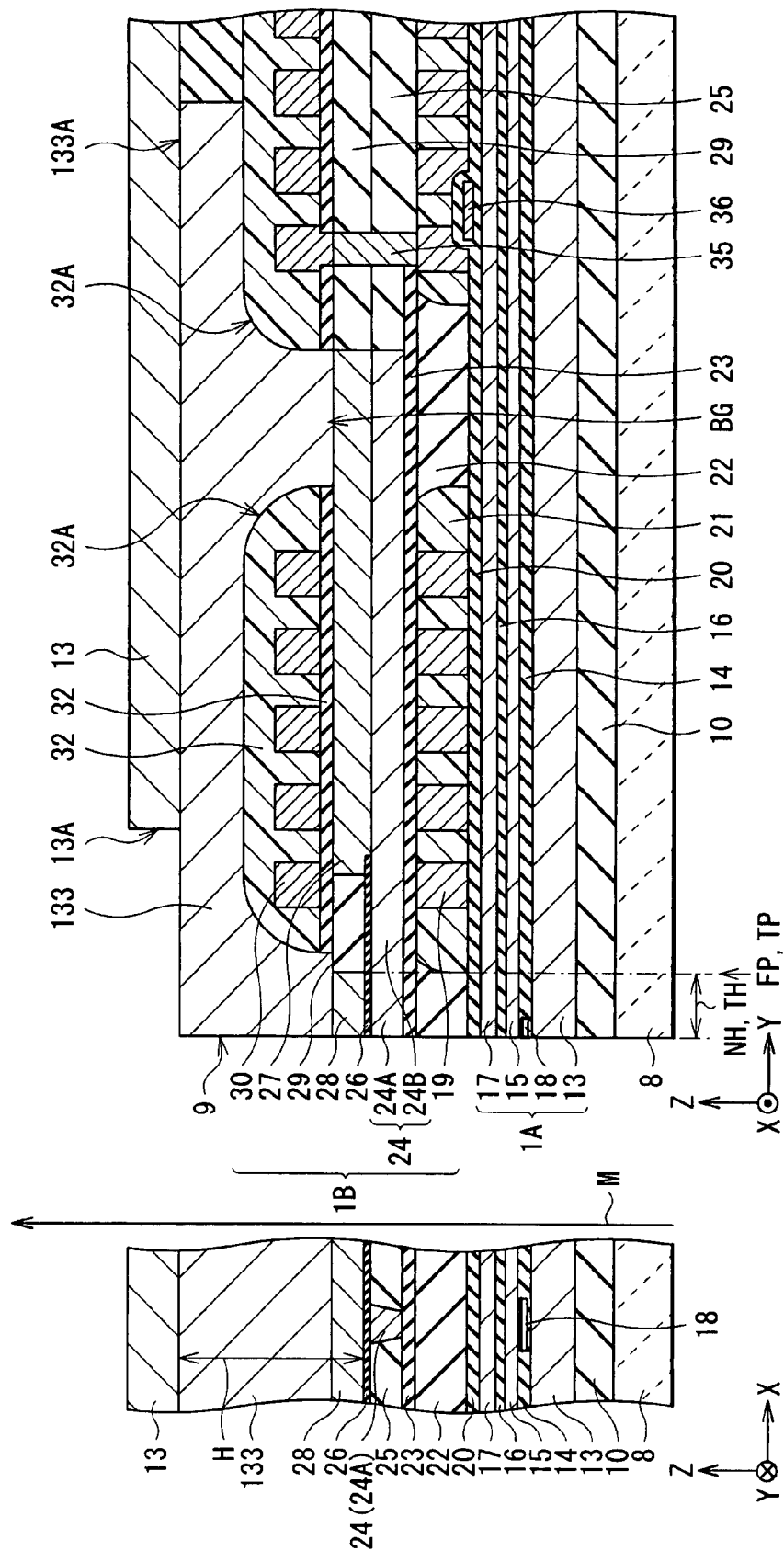
FIGS. 13a to 13b are sectional configuration views for explaining a step subsequent to a step of FIGS. 12a to 12b.

In the embodiment, since the second return yoke layer 34 is formed in a manner of extending in the Y axis direction from the position retracted from the air bearing surface 9, only the first return yoke layer 33 is exposed on the air bearing surface 9 between the two yoke layers provided on the trailing side of the main magnetic layer 24. Here, as shown in FIGS. 11A and 11B to FIGS. 13A and 13B as a comparative example, a first return yoke layer 133 is formed thick (FIGS. 11A and 11B), then the first return yoke layer 133 is polished to decrease thickness to a predetermined thickness using the CMP method (FIGS. 12A and 12B), thereby a surface for forming the thermal expansion suppression layer 12 can be similarly planarized (FIGS. 13A and 13B). However, as known from a comparison between FIG. 4B and FIG. 13B, in the comparative example, surface area of a portion exposed on the air bearing surface 9 (particularly, height H) is extremely changed, in addition, variation in height H occurs due to CMP. As a result, a characteristic of each thin film magnetic head 1 is hardly kept constant in the comparative example. On the other hand, in the embodiment, even if thickness of the second return yoke layer 34 is changed, the surface area of the portion exposed on the air bearing surface 9 (particularly, height H) is not changed at all, or kept constant. Therefore, even if a step of planarizing the top of the second return yoke layer 34 is conducted, the first return yoke layer 33 may not be varied in area exposed on the air bearing surface 9 due to planarization. As a result, thermal protrusion can be suppressed while a write characteristic of the thin film magnetic head 1 is kept constant.

For example, even if volumes of the write shield layer 28 and the first return yoke layer 33 are decreased, the second return yoke layer 34 is increased in thickness so that a volume of the second return yoke layer 34 is increased, thereby a volume of all the yoke layers can be adjusted within a predetermined range. Thus, the volumes of the write shield layer 28 and the first return yoke layer 33 are decreased, thereby thermal protrusion can be similarly suppressed.

Figures 14A, 14B:
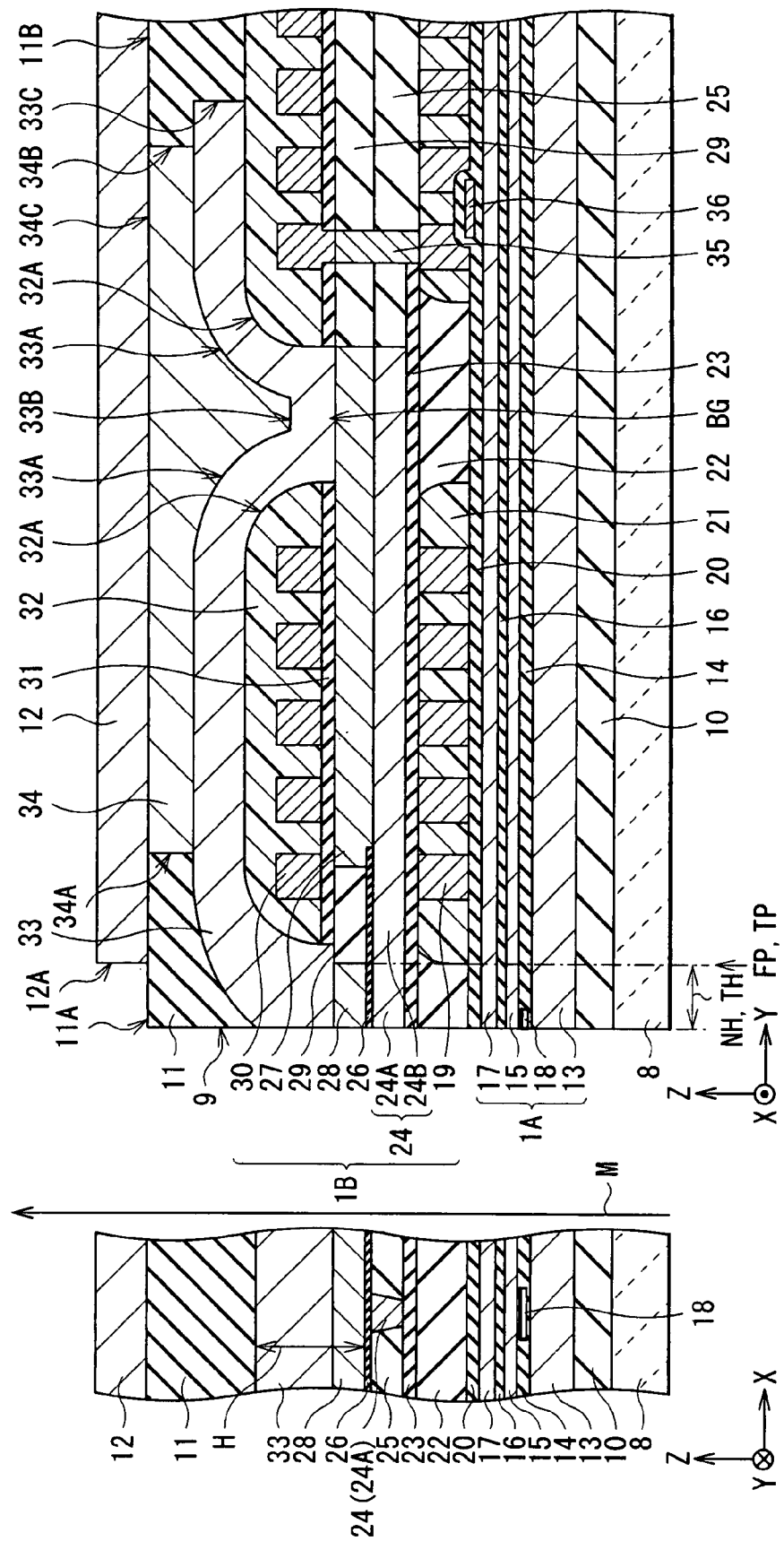
FIG. 14A is a planar configuration view of a thin film magnetic head according to a modification.
FIG. 14B is a sectional configuration view of the thin film magnetic head of FIG. 14A.

In the embodiment, when the insulating layer 11, which has the flat surface 11A in the same or approximately the same plane as the flat surface 34C of the second return yoke layer 34, is provided between the end face 34A at the side of the air bearing surface 9 of the second return yoke layer 34 and the air bearing surface 9, the edge 12A at the side of the air bearing surface 9 of the thermal expansion suppression layer 12 can be provided on the insulating layer 11 without being influenced by a step caused by the end face 34A of the second return yoke layer 34 (see FIGS. 14A and 14B). Thus, since the thermal expansion suppression layer 12 can be made further close to the side of the air bearing surface 9, thermal protrusion can be further suppressed. When the insulating layer 11, which has the flat surface 11B in the same or approximately the same plane as the flat surface 34C of the second return yoke layer 34, is provided from the end face 34B of the second return yoke layer 34 to the back of the air bearing surface 9, the thermal expansion suppression layer 12 can be formed in the back of the air bearing surface 9 without being influenced by a step caused by the end face 34B of the second return yoke layer 34.

In the embodiment, the thermal expansion suppression layer 12 is provided on the second return yoke layer 34. Thus, even if the thin film magnetic head 1 is influenced by surrounding temperature environment, the main magnetic pole layer 24, first return yoke layer 33, second return yoke layer 34 and the like are limited in displacement to the side of the air bearing surface 9 by the thermal expansion suppression layer 12. Thus, thermal protrusion in the thin film magnetic head 1 due to influence of surrounding temperature environment can be suppressed.

In the embodiment, since the thermal expansion suppression layer 12 is contacted to the second return yoke layer 34, and specifically, the thermal expansion suppression layer 12 is contacted to the second return yoke layer 34, and the second return yoke layer 34 is contacted to the first return yoke layer 33, heat generated within the thin film magnetic head 1 is transferred to the thermal expansion suppression layer 12 via the first return yoke layer 33 and the second return yoke layer 34, and radiated to the outside and the like from the thermal expansion suppression layer 12. Thus, since heat is hardly stored within the thin film magnetic head 1, thermal protrusion due to heat generated within the thin film magnetic head 1 can be suppressed.

In this way, in the embodiment, since the main magnetic pole layer 24, first return yoke layer 33, second return yoke layer 34 and the like are limited in displacement to the side of the air bearing surface 9 while high heat radiation is kept by the thermal expansion suppression layer 12, thermal protrusion can be suppressed.

In the embodiment, since the thermal expansion suppression layer 12 is contacted to the second return yoke layer 34, it may be said that the thermal expansion suppression layer 12 is electrically connected to the second return yoke layer 34. At that time, when at least one of the first return yoke layer 33 and the second return yoke layer 34 is shunted, the thermal expansion suppression layer 12 is not charged. Therefore, there is no possibility of reduction in reliability due to electrostatic charge.

Here, in the embodiment, since the thermal expansion suppression layer 12 extends from the position retracted from the air bearing surface 9 backward, for example, when the thin film magnetic head 1 is at a low temperature, there is no possibility that the thermal expansion suppression layer 12 projects to a side of the magnetic recording medium 200 with respect to the main magnetic pole layer 24 or the first return yoke layer 33. Thus, magnetic spacing can be stabilized.

In the embodiment, since the insulating layer 11 is provided in the periphery of the first return yoke layer 33 and the second return yoke layer 34, and furthermore the thermal expansion suppression layer 12 is contacted to the second return yoke layer 34, heat generated within the thin film magnetic head 1 can be transferred to the thermal expansion suppression layer 12 via the first return yoke layer 33 and the second return yoke layer 34, and radiated to the outside and the like from the thermal expansion suppression layer 12, in addition, a component can be disposed on the insulating layer 11, the component being necessary to be electrically isolated from the first return yoke layer 33 and the second return yoke layer 34. That is, the insulating layer 11 may configure part of a flat surface on which the thermal expansion suppression layer 12 is disposed as well as act as an insulting layer for electrically isolating the component from the first return yoke layer 33 and the second return yoke layer 34.

In the embodiment, since the heating element 36 is provided in the position retracted from the air bearing surface 9, the heating element 36 is heated, thereby the main magnetic pole layer 24 and the like can be actively displaced to the side of the magnetic recording medium 200. At that time, since the first return yoke layer 33 and the second return yoke layer 34 directly below the thermal expansion suppression layer 12 are restricted in displacement to the side of the magnetic recording medium 200 by the thermal expansion suppression layer 12, only a portion to be desirably displaced (such as the main magnetic pole layer 24) can be selectively displaced to the side of the magnetic recording medium 200. Thus, since magnetic spacing can be controlled, the amount of displacement to the side of the magnetic recording medium 200 of the main magnetic pole layer 24 and the like is appropriately adjusted using the heating element 36, thereby magnetic spacing can be stabilized.

While the invention was described with the embodiment and the examples hereinbefore, the invention is not limited to the embodiment and the like, and can be variously altered or modified.

Figures 15A, 15B:
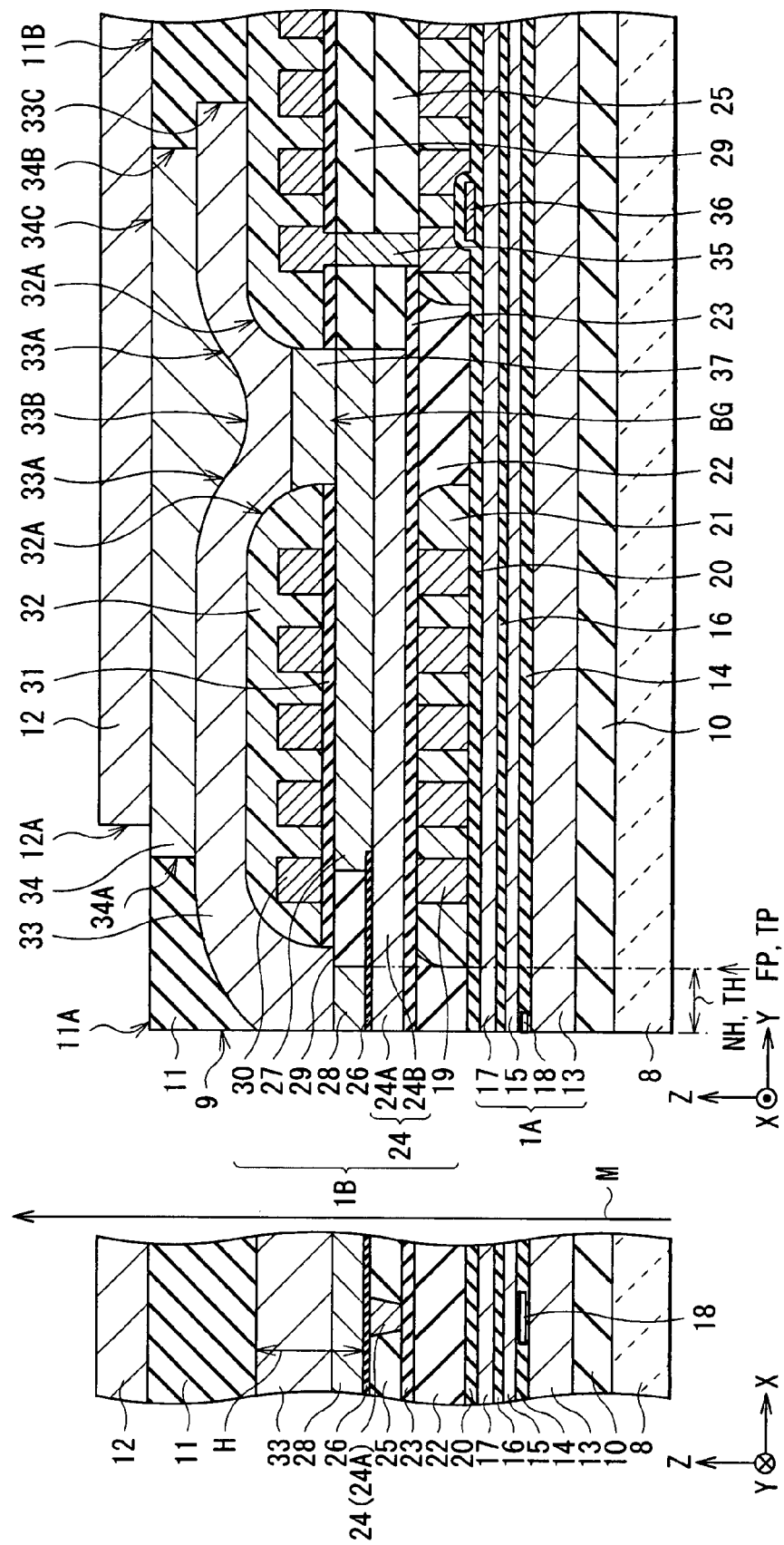
FIG. 15A is a planar configuration view of a thin film magnetic head according to another modification.
FIG. 15B is a sectional configuration view of the thin film magnetic head of FIG. 15A.
Figures 16A, 16B:
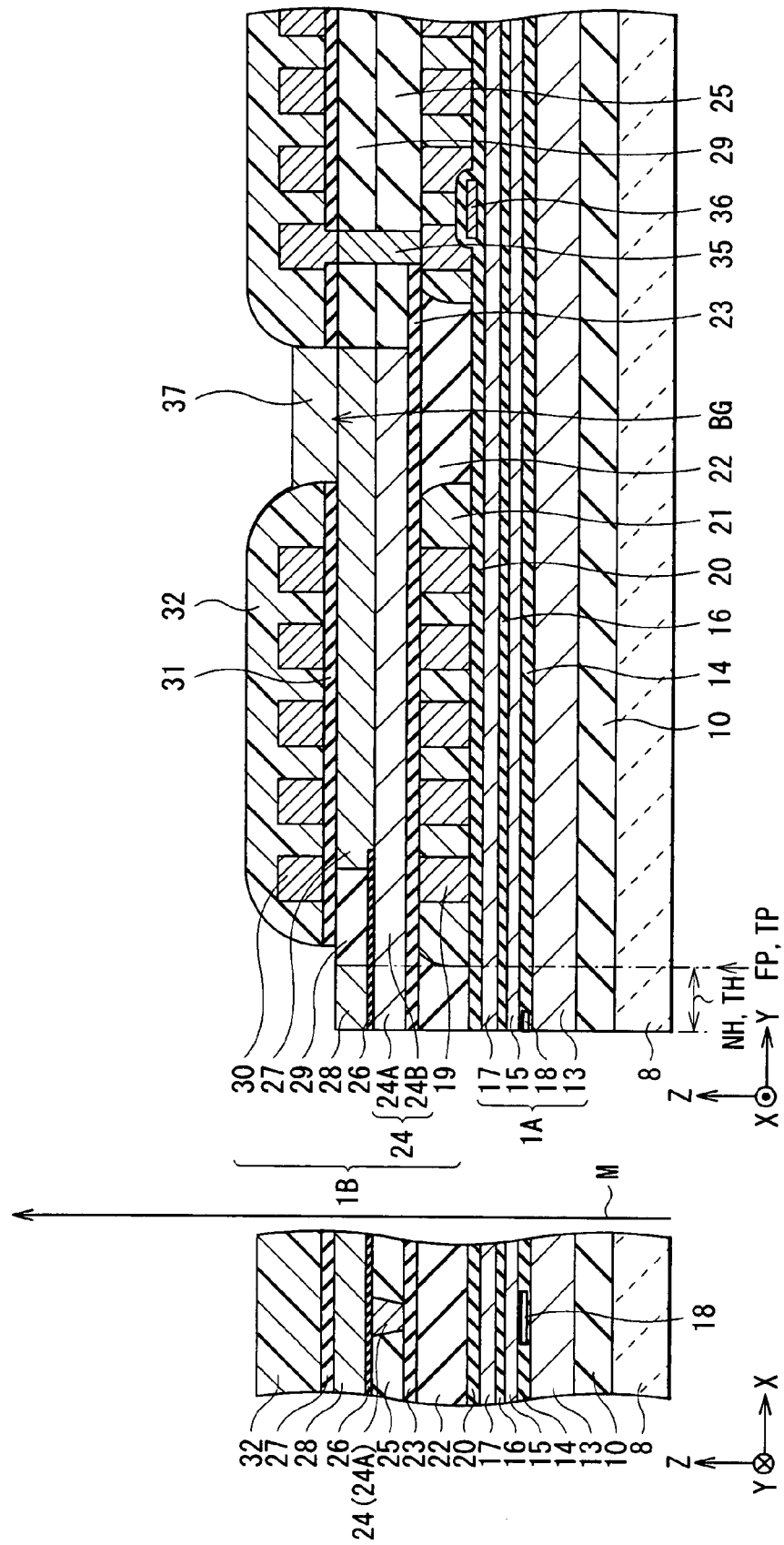
FIGS. 16a to 16b are sectional configuration views for explaining a manufacturing process of the thin film magnetic head of FIGS. 15A and 15B.
Figure 18:
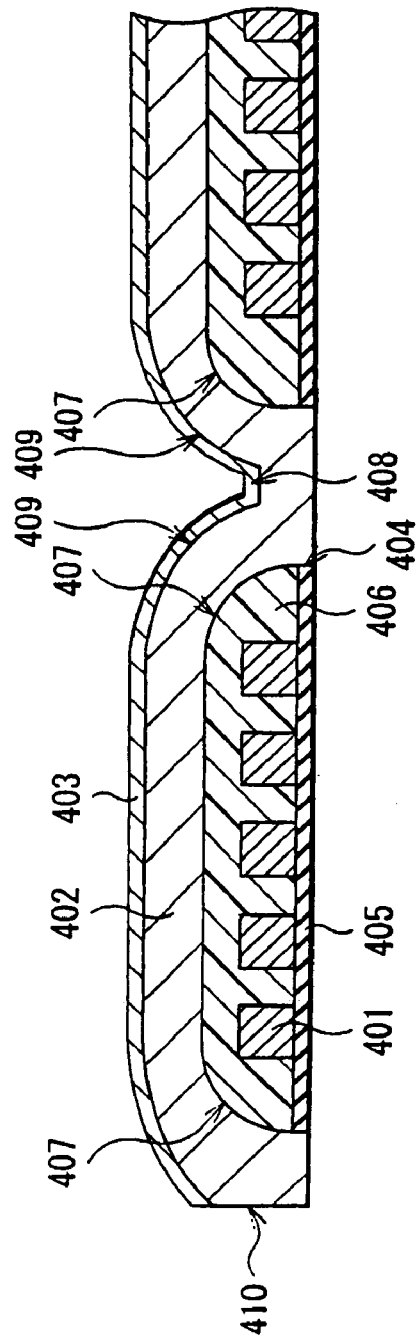
FIG. 18 is a sectional configuration view of part of a usual thin film magnetic head.

For example, as shown in FIGS. 15A and 15B, a third return yoke layer 37 may be provided on the back gap BG. In this case, the third return yoke layer 37 is formed on an area of the auxiliary magnetic pole layer 27, the area being corresponding to the back gap BG, in a step different from a step of forming the first return yoke layer 33 before forming the first return yoke layer 33 (see FIGS. 16A and 16B), then the first return yoke layer 33 can be formed on a surface including the third return yoke layer 37 (see FIGS. 17A and 17B). The third return yoke layer 37 preferably includes the same material as that of the first return yoke layer 33.

In this case, when the first return yoke layer 33 is formed, depth of the recess on the back gap BG formed by the slope 32A of the insulating layer 32 is decreased by a level corresponding to thickness of the third return yoke layer 37, consequently an aspect ratio of the recess is decreased. Thus, when the first return yoke layer 33 and the second return yoke layer 34 are formed on the recess, the recess can be securely filled, consequently possibility of generation of a void and a crack accompanying the void can be eliminated in the first return yoke layer 33 and the second return yoke layer 34. As a result, reliability is improved due to such elimination of a void and a crack.

While the lower thin film coil 19 or the heating element 36 was provided in the embodiment, they may not be provided.

What is claimed is:

1. A thin film magnetic head comprising:
a main magnetic pole layer extending in a direction crossing an air bearing surface facing a recording medium, and conducting a magnetic flux into the recording medium so that the recording medium is magnetized in a direction perpendicular to a surface of the recording medium,
a first return yoke layer provided on a trailing side of the main magnetic pole layer, a face on a trailing side of the first return yoke layer having a recess,
a second return yoke layer provided so as to fill at least the recess, and
a thermal expansion suppression layer provided on a trailing side of, and in contact with the second return yoke layer, wherein
the first return yoke layer is a separate layer from the main magnetic pole layer, and
a portion of the first return yoke layer is immediately adjacent the air bearing surface.

2. The thin film magnetic head according to claim 1:
wherein the first return yoke layer is on the main magnetic pole layer with a gap in between near the air bearing surface, and extends backward from the air bearing surface.

3. The thin film magnetic head according to claim 1:
wherein the second return yoke layer has a flat top surface above at least the recess.

4. The thin film magnetic head according to claim 1:
wherein the second return yoke layer extends backward from the air bearing surface from a position retracted from the air bearing surface to beyond a position where the recess is formed.

5. The thin film magnetic head according to claim 1:
wherein a front edge of the thermal expansion suppression layer, at a side of the air bearing surface, is located on the second return yoke layer.

6. The thin film magnetic head according to claim 1:
wherein an insulating layer is provided between a front edge of the second return yoke layer, at a side of the air bearing surface, and the air bearing surface.

7. The thin film magnetic head according to claim 6:
wherein the front edge of the thermal expansion suppression layer is located on the insulating layer.

8. The thin film magnetic head according to claim 1:
wherein the second return yoke layer is contacted to the first return yoke layer, and
the thermal expansion suppression layer is contacted to at least the second return yoke layer.

9. The thin film magnetic head according to claim 1:
wherein the second return yoke layer is formed of a material different from that of the first return yoke layer.

10. The thin film magnetic head according to claim 1:
wherein the thermal expansion suppression layer includes at least one of a silicon oxide and an aluminum nitride.

11. The thin film magnetic head according to claim 1:
wherein a heating element is provided in a position retracted from the air bearing surface.

12. A head gimbal assembly comprising:
a magnetic head slider having the thin film magnetic head according to claim 1 on one side face, and
a suspension attached with the magnetic head slider at one end thereof.

13. A head arm assembly comprising:
a magnetic head slider having the thin film magnetic head according to claim 1 on one side face,
a suspension attached with the magnetic head slider at one end thereof, and
an arm supporting the other end of the suspension.

14. A magnetic disk device having a magnetic recording medium, and a head arm assembly:
wherein the head arm assembly includes;
a magnetic head slider having the thin film magnetic head according to claim 1 on one side face,
a suspension attached with the magnetic head slider at one end thereof, and
an arm supporting the other end of the suspension.

15. The thin film magnetic head according to claim 1:
wherein the first return yoke layer is connected to the main magnetic pole layer at a back gap area, and the recess of the first return yoke layer is formed in the back gap area.

16. A method of forming a thin film magnetic head comprising:
a step of forming a main magnetic pole layer so as to extend in a direction crossing a air bearing surface facing a recording medium, and to conduct a magnetic flux into the recording medium so that the recording medium is magnetized in a direction perpendicular to a surface of the recording medium, then forming a first return yoke layer having a recess on a trailing side of the main magnetic pole layer,
a step of forming a second return yoke layer with a magnetic material so as to fill at least the recess, and
a step of forming a thermal expansion suppression layer on a trailing side of, and in contact with the second return yoke layer, wherein
the first return yoke layer is a separate layer from the main magnetic pole layer, and
a portion of the first return yoke layer is formed immediately adjacent the air bearing surface.

17. The method of forming the thin film magnetic head according to claim 16:
wherein a top surface of the second return yoke layer, at least in an area above the recess, is planarized, then the thermal expansion suppression layer is formed on the planarized surface.

* * * * *